US010848824B2

(12) United States Patent
Brinkley et al.

(10) Patent No.: US 10,848,824 B2
(45) Date of Patent: Nov. 24, 2020

(54) DYNAMIC DETECTION AND MITIGATION OF MULTIMEDIA STREAM ABANDONMENT

(71) Applicant: Amazon Technologies, Inc., Seattle, WA (US)

(72) Inventors: Matthew Brinkley, Portland, OR (US); Meera Jindal, Portland, OR (US); Khawaja Salman Shams, Portland, OR (US); Alex Xiaoye Zhang, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 15/624,453

(22) Filed: Jun. 15, 2017

(65) Prior Publication Data

US 2018/0367847 A1   Dec. 20, 2018

(51) Int. Cl.
*H04N 21/442* (2011.01)
*H04N 21/647* (2011.01)
(Continued)

(52) U.S. Cl.
CPC ..... *H04N 21/44222* (2013.01); *H04N 21/236* (2013.01); *H04N 21/2668* (2013.01);
(Continued)

(58) Field of Classification Search
CPC ........... H04N 21/44204; H04N 21/252; H04N 21/251; G06N 3/08; H04H 60/33
See application file for complete search history.

(56) References Cited

U.S. PATENT DOCUMENTS

| 9,426,538 B2 | 8/2016 | Byers |
| 9,510,025 B1 | 11/2016 | Einarsson et al. |

(Continued)

FOREIGN PATENT DOCUMENTS

| EP | 1118213 A1 | 7/2001 |
| WO | 9966719 A1 | 12/1999 |
| WO | 2014004955 A1 | 1/2014 |

OTHER PUBLICATIONS

International Search Report and Written Opinion dated Aug. 3, 2018, International Patent Application No. PCT/US2018/035211, filed May 30, 2018, 16 pages.

(Continued)

*Primary Examiner* — Brian T Pendleton
*Assistant Examiner* — Frank Johnson
(74) *Attorney, Agent, or Firm* — Davis Wright Tremaine LLP

(57) ABSTRACT

A multimedia stream may be abandoned (e.g., terminated) under various contexts. Metadata surrounding the abandonment, such as information regarding multimedia segments shown at or near the time of abandonment, may be stored. A system may detect satisfaction of a condition based at least in part on abandonment metadata associated with an abandoned stream, obtain a set of abandonment metadata sharing a characteristic in common, and determine a cause. Depending on the determined cause, various mitigations may be executed—for example, if abandonment of streams is detected in a specific location at a particular point or period in time, one or more network diagnostics tests may be executed to determine whether there are network connectivity issues for viewers from the specific location.

20 Claims, 10 Drawing Sheets

(51) Int. Cl.
H04N 21/236 (2011.01)
H04N 21/2668 (2011.01)
H04N 21/4425 (2011.01)
H04N 21/25 (2011.01)

(52) U.S. Cl.
CPC ... *H04N 21/4425* (2013.01); *H04N 21/44204* (2013.01); *H04N 21/6473* (2013.01); *H04N 21/251* (2013.01)

(56) References Cited

U.S. PATENT DOCUMENTS

| | | | | |
|---|---|---|---|---|
| 2003/0149975 | A1* | 8/2003 | Eldering | H04N 7/17318 725/34 |
| 2003/0172376 | A1* | 9/2003 | Coffin, III | G06Q 30/02 725/22 |
| 2007/0074258 | A1* | 3/2007 | Wood | H04N 7/17318 725/105 |
| 2008/0092182 | A1* | 4/2008 | Conant | H04N 7/17318 725/109 |
| 2010/0228591 | A1 | 9/2010 | Therani et al. | |
| 2011/0161997 | A1* | 6/2011 | Rourk | H04N 21/25435 725/5 |
| 2011/0225417 | A1 | 9/2011 | Maharajh et al. | |
| 2011/0264530 | A1 | 10/2011 | Santangelo et al. | |
| 2011/0320583 | A1* | 12/2011 | Parker | H04H 60/32 709/224 |
| 2012/0110615 | A1* | 5/2012 | Kilar | G06Q 30/02 725/32 |
| 2012/0131125 | A1* | 5/2012 | Seidel | H04N 5/76 709/212 |
| 2013/0051247 | A1* | 2/2013 | Reese | H04L 43/08 370/242 |
| 2014/0201766 | A1* | 7/2014 | Stepanov | H04N 21/80 725/9 |
| 2015/0046922 | A1* | 2/2015 | Allen | G06F 8/63 718/1 |
| 2015/0350369 | A1* | 12/2015 | Ilsar | H04L 67/2847 709/219 |
| 2016/0036693 | A1* | 2/2016 | Galdy | G06F 9/00 709/219 |
| 2016/0277952 | A1* | 9/2016 | Hui | H04W 24/08 |
| 2016/0323343 | A1 | 11/2016 | Sanghavi et al. | |
| 2018/0131975 | A1 | 5/2018 | Badawiyeh et al. | |
| 2018/0359477 | A1 | 12/2018 | Yang | |

OTHER PUBLICATIONS

European Communication pursuant to Article 94(3) EPC dated Sep. 18, 2020, Patent Application No. 18732591.5, 11 pages.

* cited by examiner

DYNAMIC DETECTION AND MITIGATION OF MULTIMEDIA STREAM ABANDONMENT

CROSS-REFERENCE TO RELATED APPLICATIONS

This application is related to and incorporates by reference for all purposes the full disclosure of co-pending U.S. patent application Ser. No. 15/624,450, entitled "DYNAMIC MULTIMEDIA STREAM INSERTION FROM MULTIPLE SOURCES," filed concurrently herewith.

BACKGROUND

Customers and other users often access a digital content provider to stream a variety of digital content. Upon request, the digital content provider may stream the digital content onto a viewer's computing device, thereby enabling the viewer to access and use the digital content through their own computing device. Customizing the delivery of digital content to viewers is challenging and it may be inefficient and/or impractical to pre-generate a customized stream for each viewer. Attempting to pre-generate customized content for a large number of users may significantly increase the computational resources needed by providers of the digital content.

While dynamically generating customized content may be more advantageous to pre-generating customized content, there are many technical challenges in dynamically generating customized content. Customized content may have multiple sources from which the content is generated. In complex systems with a large number of users, dynamic multimedia stream insertion from multiple sources presents many complex technical challenges.

BRIEF DESCRIPTION OF THE DRAWINGS

Various techniques will be described with reference to the drawings, in which.

DETAILED DESCRIPTION

Figure 1:
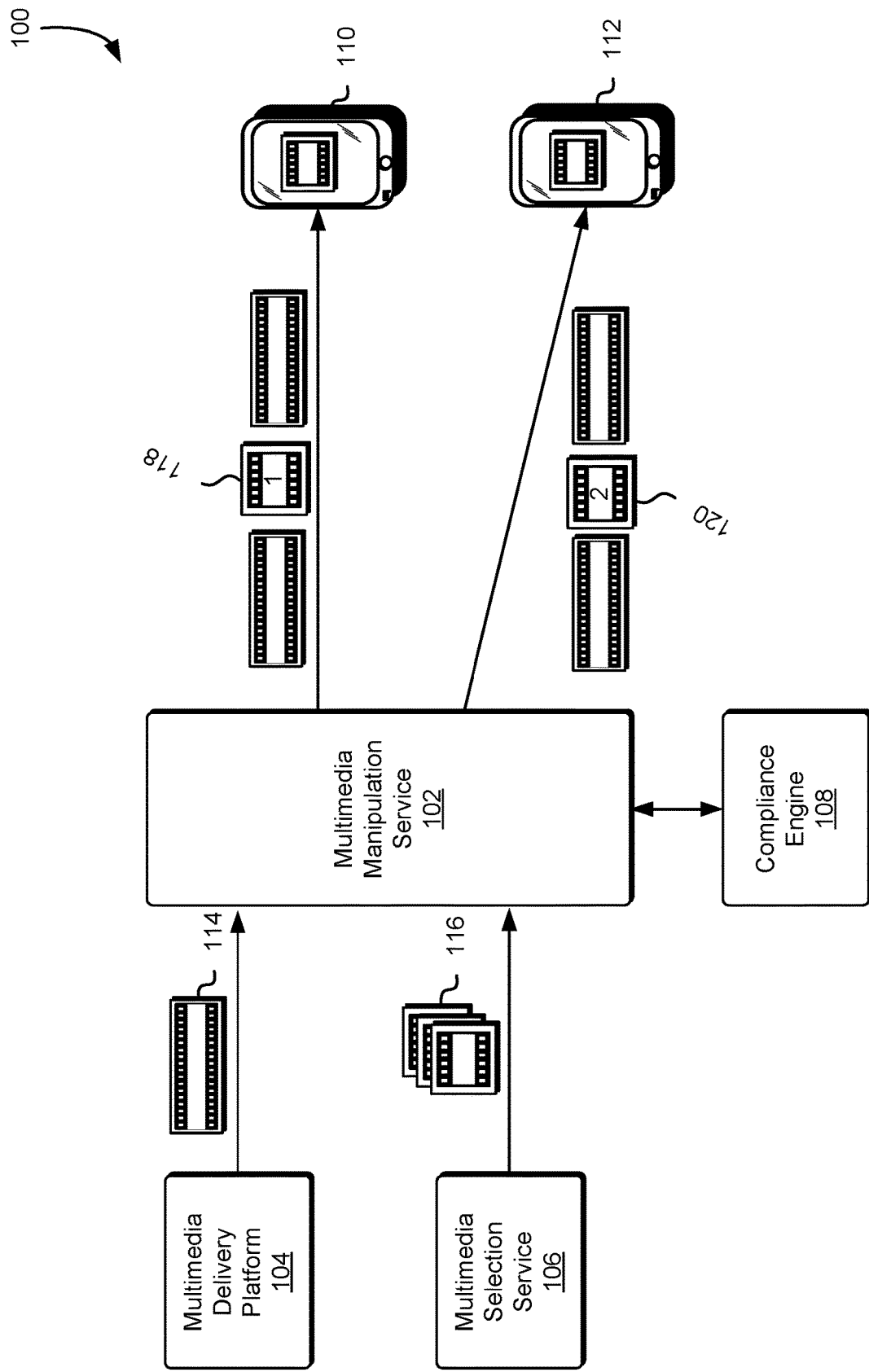
FIG. 1 illustrates an environment in which various embodiments can be implemented.

A multimedia manipulation service may be a service that is used as part of a process to perform dynamic insertion of multimedia content to a stream in a customized manner. For example, two viewers may make the same request (e.g., a request to watch a particular program such as a movie, a sports event, a live broadcast) and a first viewer of a first multimedia playback device may receive a multimedia stream that is different from the stream received by a second viewer on a second multimedia playback device. The multimedia manipulation service may be configured to perform a process for dynamically generating multimedia output streams such that the multimedia manipulation service is configured to: receive a request for multimedia content; receive one or more multimedia segments of the requested content from a multimedia delivery platform; detect that at least one of the segments of the received segments includes an insertion marker (e.g., in a manifest); provide metadata associated with the requestor to a multimedia selection service; receive, in response to the provided metadata, one or more additional segments; and transmit, to the requestor, a multimedia output stream using the one or more multimedia segments received from the multimedia delivery platform and the one or more additional segments received from the multimedia selection service. Such a process may be used to generate customized multimedia output to different requestors based on metadata related to the requestor which may include information about the viewer, the playback device, geolocation, etc., which may be used to better determine how to customize the content for the viewer's enjoyment.

The multimedia manipulation service may be utilized in several contexts, such as customizing the multimedia content served to multiple viewers based on the respective viewers' preferences. For example, consider the case in which the multimedia manipulation service receives requests from multiple viewers to watch a movie. In this example, the multimedia manipulation service also receives metadata about each user making the request, such as other movies that a particular user has rated, the type of movie (e.g., action, comedy, romance), etc., and uses the metadata to customize the movie based on each viewer's preferences. Continuing with the example—when the multimedia manipulation service receives the request to view the movie, the multimedia manipulation service receives a multimedia stream for the movie from the multimedia delivery platform. The movie stream is split into multimedia segments that include metadata such as an insertion marker.

The insertion marker may indicate where content should be dynamically inserted, how long the content should be, and so on. Continuing with the same example, the movie may be an action movie having an insertion marker at the start of a "car chase" scene; the multimedia manipulation service may detect the insertion marker and retrieve segments for the "car chase" scene from the multimedia selection service. As part of retrieval, the multimedia manipulation service may provide the requestor's username and/or previous movie ratings as metadata to the multimedia selection service as part of a request. The multimedia selection service may use the received metadata to determine which multimedia segments to provide the multimedia manipulation service in connection with the request. For example, the multimedia selection service may have access to multiple version of the "car chase" scene—for example, a default version; an extended version (e.g., a longer chase); a dramatic version (e.g., more explosions); a bloody version (e.g., with blood and gore); a non-bloody version (e.g., no blood); and so on. The multimedia selection service may use metadata about the user (such as the user's previous ratings) to select a version of the "car chase" stored in a media repository, backend storage system, etc. The selection may be performed in various ways, such as by assigning an individualized score to each of the versions based on the user's past ratings histories (e.g., high ratings to previous action movies may indicate that a longer or more dramatic chase scene is appropriate for the user) and selecting the version having the highest individualized score.

A compliance routine may be utilized to determine whether the insertion segment provided by the multimedia selection service to the multimedia manipulation service should be used. In some examples, an event-driven compute service is utilized in connection with the compliance routine to receive metadata related to the multimedia input stream provided by the multimedia delivery platform, metadata related to the insertion segment provided by the multimedia selection service, and metadata about the request (e.g., metadata about the user requesting the media and/or playback device). The compliance routine may determine whether the provided insertion segment meets one or more compliance criteria. For example, a compliance criteria may determine that the insertion segment includes content that is inappropriate for certain age groups (e.g., the insertion segment may include vulgar language that is not appropriate for younger viewers) and determine whether the requestor meets the criteria. For example, the multimedia selection service may be used to provide two or more insertion segments corresponding to advertisements that are inserted to a broadcast, and the compliance routine may be run to verify whether one or more compliance criteria are satisfied by the advertisement, either individually and/or in combination. It should be noted that certain advertisements satisfy the compliance criteria individually during the broadcast but not in conjunction with each other—one such example would be a compliance requirement that if an advertisement for a first automobile manufacturer is shown during the broadcast, that advertisements for other automobile manufacturers should not be shown for the remainder of the broadcast. More generally speaking, metadata about the insertion segments may be used to determine compliance of the insertion segments based on which other insertion segments were selected. In some cases, the multimedia manipulation service does not directly provide the selected segments to the multimedia playback devices, but rather, the multimedia manipulation service provides the segments to a content delivery network. A content delivery network (CDN) may refer to a network that delivers content to users with high availability and high performance. One or more CDNs may then provide content to multimedia playback devices.

In some examples, a multimedia source is provided directly to the multimedia delivery platform by a customer. However, it should be noted that in other cases the multimedia source may be provided indirectly to the multimedia delivery platform, such as via a transcoder. For example, the customer may provide the multimedia source to a transcoder which transcodes the source from one encoding format to another such that various qualities of the transcoded media may be different from the source (the resolution, aspect ratio, bit rate, frame rate, etc., may be different). This may occur in cases where the multimedia delivery platform requires the received multimedia be of a particular format or set of formats. In some cases, the customer provides, to the multimedia delivery platform, an identifier or network address or other information that may be used by the multimedia delivery platform to obtain the multimedia source. For example, the multimedia delivery platform may receive a URL to a video, retrieve the video, determine that the video does not match the required format, provide the video to a transcoder with instructions to transcode the video to a particular format, and receive a transcoded version of the video.

An event-driven compute service may determine when an event occurs and perform an event-driven function in response to the event being triggered. An event trigger may, for example, be the detection of an insertion segment being provided to the multimedia manipulation service when an insertion segment is selected by the multimedia selection service or otherwise made available to the multimedia manipulation service, the event-driven compute service may be notified (e.g., by the component itself or a polling service that monitors the selection of insertion segments) that a multimedia segment has been selected and may be inserted to a particular multimedia stream, determine whether conditions for triggering a segment polisher have been satisfied, and specify custom code or logic that should be run in response to any conditions that are satisfied. The event-driven compute service may have access to a repository of event-driven functions. The repository may be any suitable storage system and may include hardware, software, and a combination thereof. The repository may include an association between trigger conditions to event-driven functions to be invoked upon satisfaction of the associated trigger. The repository may be implemented using a database, data structures such as a map data structure (i.e., an associative array), and any combination thereof. For example, there may exist an association between an event indicating a particular insertion segment has been selected for a particular multimedia source and an event-driven function that may be used to determine whether the insertion segment should be used as part of a multimedia output stream. There may also be an association between the customer and the event-driven function. When an event is received by the event-driven compute service, the event-driven compute service may access the event-driven functions repository and obtain the event-driven function corresponding to the event. A customer can provide the event-driven function in the form of executable code, source code, an application, a script, etc., to the event-driven compute service, the event-driven function may be stored in a repository of event-driven functions, and the event-driven function may be invoked as a compliance routine under certain conditions. One or more default event-driven functions may exist as well—for example, a default event-driven function to verify that the resolution, aspect ratio, frame rate (or some combination thereof) of the multimedia source and the insertion segment are matched may exist in some systems.

After using the event to obtain one or more event-driven functions associated with the event, the event-driven compute service may invoke the one or more obtained event-driven functions. The event may be triggered by the multimedia manipulation service receiving an insertion segment in the form of a video file, a URL to a mezzanine-quality multimedia segment with metadata indicating a desired encoding format, and the like. The event-driven compute service may receive the event, select one or more event-driven functions that should be invoked in response to the event, and use the compliance routine to invoke the event-driven functions that are appropriate in response to the event.

In the preceding and following description, various techniques are described. For purposes of explanation, specific configurations and details are set forth in order to provide a thorough understanding of possible ways of implementing the techniques. However, it will also be apparent that the techniques described below may be practiced in different configurations without the specific details. Furthermore, well-known features may be omitted or simplified to avoid obscuring the techniques being described.

FIG. 1 illustrates an environment in which various embodiments can be implemented. The computing environment 100 illustrates a multimedia manipulation service 102; a multimedia delivery platform 104; a multimedia selection service 106; a compliance routine 108; and multimedia playback devices 110 and 112.

The multimedia manipulation service 102 may be a service that is used as part of a process to perform dynamic insertion of multimedia content to a stream in an individualized manner. For example, two viewers may make the same request (e.g., a request to watch a particular program such as a movie, a sports event, a live broadcast) and a first viewer of a first multimedia playback device 110 may receive a multimedia stream that is different from the stream received by a second viewer on a second multimedia playback device 112. The multimedia manipulation service 102 may be implemented using software, hardware, or a combination thereof. In some embodiments, the multimedia manipulation service 102 is configured to receive a multimedia input stream 114 that includes one or more multimedia segments. The multimedia input stream 114 may be in accordance with various standards and protocols such as the HTTP Live Streaming (HLS) protocol, Dynamic Adaptive Streaming over HTTP (DASH), HTTP Dynamic Streaming (HDS) protocol, Smooth Streaming protocol, and the like. In various embodiments, the multimedia input stream 114 may be represented by multiple multimedia segments having corresponding manifest files. A multimedia segment may be a slice of multimedia content for example, the multimedia content corresponds to a movie or TV show and the multimedia segments are contiguous two-second slices of the segment that, when assembled, forms the movie or show. One or more segments of the multimedia input stream 114 may include an indication to insert multimedia content. The multimedia manipulation service 102 may be further configured to receive additional multimedia content (e.g., insertion segments 116 from a multimedia selection service 106. The multimedia content (e.g., insertion segments 110 may be selected based at least in part on the recipient for a particular multimedia output stream. For example, the content selected for a first viewer of a first multimedia playback device 110 may be different from the content selected for a second viewer of a second multimedia playback device 112.

The multimedia manipulation service 102 may be configured to perform a process for dynamically generating multimedia output streams such that the multimedia manipulation service includes software configured to: receive a request for multimedia content; receive one or more multimedia segments 114 of the requested content from a multimedia delivery platform 104; detect that at least one of the segments of the received segments includes an insertion marker (e.g., in a manifest); provide metadata associated with the requestor to a multimedia selection service 106; receive, in response to the provided metadata, one or more additional segments; and transmit, to the requestor, a multimedia output stream using the one or more multimedia segments 114 received from the multimedia delivery platform 104 and the one or more additional segments received from the multimedia selection service 106. Such a process may be used to generate customized multimedia output to different requestors based on metadata related to the requestor which may include information about the viewer, the playback device, geolocation, etc., which may be used to better determine how to customize the content for the viewer's enjoyment.

The multimedia manipulation service 102 may be utilized in several contexts, such as customizing the multimedia content served to multiple viewers based on the respective viewers' preferences. For example, consider the case in which the multimedia manipulation service 102 receives requests from multiple viewers to watch a movie. In this example, the multimedia manipulation service 102 also receives metadata about each user making the request, such as other movies that a particular user has rated the type of movie (e.g., action, comedy, romance) and uses the metadata to customize the movie based on each viewer's preferences. Continuing with the example—when the multimedia manipulation service 102 receives the request to view the movie, the multimedia manipulation service 102 receives a multimedia stream for the movie from the multimedia delivery platform. The movie stream is split into multimedia segments that include metadata such as an insertion marker.

The insertion marker may indicate where content should be dynamically inserted, how long the content should be, and so on. Continuing with the same example, the movie may be an action movie having an insertion marker at the start of a "car chase" scene; the multimedia manipulation service 102 may detect the insertion marker and retrieve segments for the "car chase" scene from the multimedia selection service 106. As part of retrieval, the multimedia manipulation service 102 may provide the requestor's username and/or previous movie ratings as metadata to the multimedia selection service 106 as part of a request. The multimedia selection service 106 may use the received metadata to determine which multimedia segments to provide the multimedia manipulation service 102 in connection with the request. For example, the multimedia selection service 106 may have access to multiple version of the "car chase" scene—for example, a default version; an extended version (e.g., a longer chase); a dramatic version (e.g., more explosions); a bloody version (e.g., with blood and gore); a non-bloody version (e.g., no blood); and so on. The multimedia selection service 106 may use metadata about the user (such as the user's previous ratings) to select a version of the "car chase" stored in a media repository, backend storage system, etc. The selection may be performed in various ways, such as by assigning an individualized score to each of the versions based on the user's past ratings histories (e.g., high ratings to previous action movies may indicate that a longer or more dramatic chase scene is appropriate for the user) and selecting the version having the highest individualized score. An identifier to the selected multimedia segment, such as a network address, a uniform resource identifier (URI), a uniform resource locator (URL), and the like may be provided to the multimedia manipulation service 102. Additionally, in some embodiments, a security token may be provided in conjunction with the identifier such that retrieval of and/or access to the media is predicated upon presentation of the security token. The multimedia selection service 106 may be implemented using hardware, software, or a combination thereof.

The compliance routine 108 may be utilized to determine the compliance of an insertion segment provided by the multimedia selection service 106 to the multimedia manipulation service 102. In some embodiments, an event-driven compute service such as those described elsewhere in this disclosure may be utilized in connection with the compliance routine 108. The compliance routine may be configured to receive metadata related to the multimedia input stream 114 provided by the multimedia delivery platform 104, metadata related to the insertion segment 116 provided by the multimedia selection service 106, and metadata about the request (e.g., metadata about the user requesting the media and/or playback device). The compliance routine 108 may determine whether the provided insertion segment meets one or more compliance criteria. For example, a compliance criteria may determine that the insertion segment 116 includes content that is inappropriate for certain age groups (e.g., the insertion segment 116 may include vulgar language that is not appropriate for younger viewers) and determine whether the requestor meets the criteria. The determination may be made using various information available to the system—for example, the viewer may have been prompted to input his/her age prior to viewing the requested movie. As a second example, the multimedia selection service 106 may be used to provide two or more insertion segments corresponding to advertisements that are inserted to a broadcast, and the compliance routine 108 may include a compliance criteria that certain advertisements may be shown individually during the broadcast but not in conjunction with each other—one such example would be a compliance requirement that if an advertisement for a first automobile manufacturer is shown during the broadcast, that advertisements for other automobile manufacturers should not be shown for the remainder of the broadcast. More generally speaking, metadata about the insertion segments may be used to determine compliance of the insertion segments based on which other insertion segments were selected.

The compliance routine 108 may be configured to utilize event-driven functions in determining the compliance of a selected insertion segment. For example, a content provider (e.g., the content provider for the input stream 114, the insertion segment 116, or both) can specify one or more custom compliance criteria that are invoked when the particular content is provided to the multimedia manipulation service 102. Thus, an insertion segment may be appropriate in some cases (e.g., where the compliance logic associated with a first input stream determines the insertion segment passes the compliance criteria) but not in other cases (e.g., where the compliance logic associated with a second input stream determines that the insertion segment is not in compliance with a different set of compliance criteria). In some environments, a content provider provides a multimedia input source either indirectly (e.g., the source multimedia is first provided to a transcoder and a transcoded version of the source multimedia is provided to the multimedia delivery platform 104) or directly to the multimedia delivery platform 104 and also provides one or more compliance logics that are used in connection with the compliance logic. An example of such an environment is described elsewhere in this disclosure in connection with FIG. 2. The compliance routine 108 may provide an indication to the multimedia manipulation service 102 that indicates whether an insertion segment satisfies one or more compliance criteria.

The multimedia manipulation service 102 may be configured to dynamically generate output customized multimedia output streams. An insertion segment selected for a particular user may be dynamically inserted into a multimedia output stream that includes one or more segments of a multimedia input stream 114 as well as one or more insertion segments. As discussed above, an insertion segment may be selected based at least in part on metadata relating to the requestor. For a first request made by a viewer of the first multimedia playback device 110, a multimedia output stream may include a first customized insertion segment 118 that was provided by the multimedia selection service 106 to the multimedia manipulation service 102. For a second request made by a viewer of the second multimedia playback device 112, a multimedia output stream may include a second customized insertion segment 120 that was provided by the multimedia selection service 106 to the multimedia manipulation service 102 where the first customized insertion segment 118 and the second customized insertion segment 120 include different multimedia content.

It should further be noted that in some cases, the selection of an insertion segment is made based at least in part on the playback device. For example, in the case where a viewer requests a particular piece of multimedia content on a first multimedia playback device that is a mobile device, the multimedia selection service may provide content based on the mobile device—for example, if the insertion segment is an advertisement, the selected advertisement may be from a cellular service provider. Similarly, if the same user requests the same content from a second multimedia playback device (e.g., a set-top box) from the user's residence, the selected advertisement may be for furniture, cooking, landline cable services, and the like. Thus, as has been made clear by the previous and the following, metadata such as the type of multimedia playback device, geolocation of the playback device, and other information may be used at least in part of the selection of an insertion segment. Other information may include, for example, a network address, IP address, device name (e.g., as designated by the user), MAC address, audio and/or visual information provided by sensors of the playback device (e.g., a hardware-based capture device such as a webcam), and the like. A multimedia playback device, such as those shown in FIG. 1, may include hardware sensors such as a global positioning satellite (GPS) receiver.

A multimedia playback device may be a device that requests and/or receives multimedia content. A multimedia device, such as those shown in FIG. 1, may be a smartphone, tablet computing device, personal computer, laptop, set-top box, smart television, and the like. A viewer may use the multimedia playback device to view multimedia either directly (e.g., in the case of a smartphone which has a built-in display) or indirectly (e.g., in the case of a set-top box connected to a television). A viewer that receives multimedia served in accordance with techniques described herein may be more satisfied with the quality of the multimedia content he or she is presented with.

In some embodiments, the multimedia manipulation service 102 does not directly provide the selected segments to the multimedia playback devices 110 and 112 but, rather, the multimedia manipulation service 102 provides the segments to a content delivery network (not shown in FIG. 1). A content delivery network (CDN) may refer to a network that delivers content to users with high availability and high performance. One or more CDNs may then provide content to multimedia playback devices.

Figure 2:
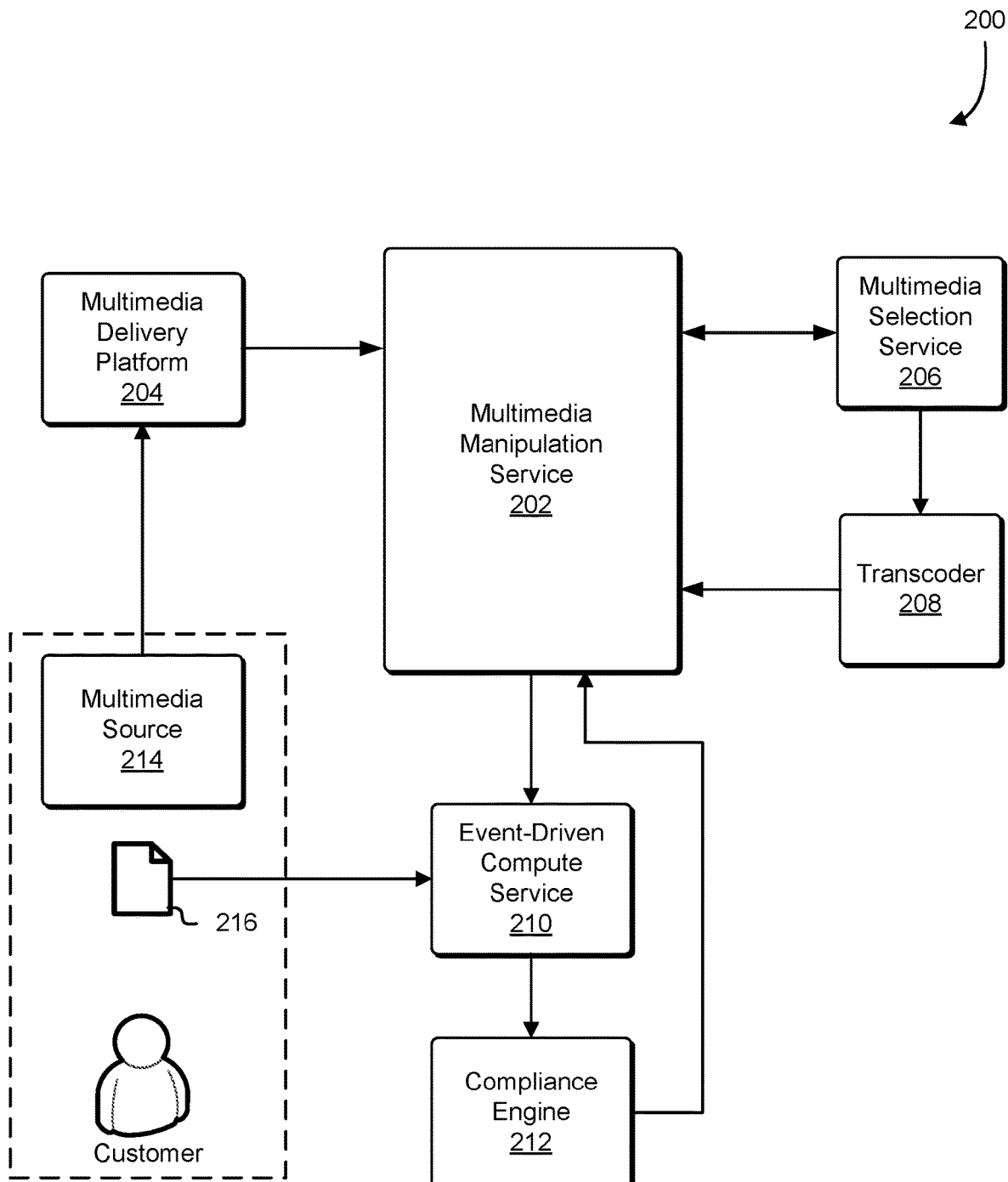
FIG. 2 illustrates an environment in which a compliance routine can be implemented in conjunction with an event-driven compute service.

FIG. 2 illustrates an environment in which various embodiments can be implemented utilizing an event-driven compute service. The computing environment 200 illustrates a multimedia manipulation service 202; a multimedia delivery platform 204; a multimedia selection service 206; a transcoder 208; an event-driven compute service 210; a compliance routine 212; a multimedia source 214; and compliance logic 216. The multimedia source 214 and the compliance logic 216 may be provided to various components of the computing environment 200 by a customer or third-party entity.

The multimedia manipulation service 202, multimedia delivery platform 204, and multimedia selection service 206 may be implemented in any suitable manner such as those described elsewhere in connection with FIG. 1 of this disclosure. The multimedia manipulation service 202 may also be configured to provide data and/or metadata to an event-driven compute service 210 that may be used by the compliance routine 212 to determine whether an insertion segment is appropriate or if another insertion segment should be used. For example, when a multimedia selection service 206 selects an insertion segment and provides the selection data to the multimedia manipulation service 202, the event-driven compute service may receive information related to the insertion segment, such as a URL to the insertion segment, audiovisual information about the segment, such as its resolution, frame rate, bit rate, length, and more. The multimedia manipulation service 202 may also be configured to receive multimedia data from a transcoder 208, which may occur when an insertion segment selected by the multimedia selection service is not available in a particular format and is transcoded as part of a process for selecting the insertion segment.

A multimedia delivery platform 204 may receive multimedia from one or more transcoders and perform various operations using the received multimedia. The multimedia delivery platform 204 may receive multimedia from one or more transcoders and perform various operations using the received multimedia. As an example, a multimedia delivery platform 204 may receive multiple copies of a multimedia segment from various transcoders and/or encoders in various formats and select the most appropriate video and audio formats to provide to a particular playback device. In the example, the multimedia delivery platform 204 may provide a smartphone video that is at most 720p resolution if the viewer cannot tell the difference between 720p and 1080p video on the smaller-sized smartphone display. In this way, the multimedia delivery platform 204 may provide a viewer of the multimedia content the best available quality on a smartphone while at the same time reducing bandwidth costs and initial video starting delay due to buffering 720p video rather than 1080p video. Likewise, for devices that only support stereo audio, the multimedia delivery platform 204 may serve only AAC stereo audio format and not 5.1 Surround Sound audio for similar reasoning as above in connection with the selection of appropriate video formats. The multimedia delivery platform 204 may be configured to provide additional functionality, such as inserting advertisements into the multimedia content.

FIG. 2 illustrates an environment where a multimedia source 214 (e.g., a MP4 video file) is provided directly to the multimedia delivery platform 204 by a customer. However, it should be noted that in some embodiments, the multimedia source 214 may be provided indirectly to the multimedia delivery platform 204, such as via a transcoder. For example, the customer may provide the multimedia source 214 to a transcoder (not shown in FIG. 2) which transcodes the multimedia source 214 from one encoding format to another such that various qualities of the transcoded media may be different from the source (the resolution, aspect ratio, bit rate, frame rate, etc., may be different). This may occur in cases where the multimedia delivery platform 204 requires the received multimedia be of a particular format or set of formats. In some embodiments, the customer provides, to the multimedia delivery platform 204, an identifier or network address or other information that may be used by the multimedia delivery platform 204 to obtain the multimedia source 214. For example, the multimedia delivery platform 204 may receive a URL to a video, retrieve the video, determine that the video does not match the required format, provide the video to a transcoder with instructions to transcode the video to a particular format, and receive a transcoded version of the video.

The multimedia selection service 206 may receive a request from the multimedia manipulation service 202 indicating a request for an insertion segment. The multimedia selection service 206 may select a suitable insertion segment based on information received as part of the request (e.g., user metadata, device type, geolocation). The multimedia selection service 206 may obtain the insertion segment or a reference to the selected insertion segment which may be a URL. In some embodiments, a transcoder 208 may be utilized in conjunction with the request for an insertion segment. For example, a particular insertion segment may be available in one format but not another format. When the multimedia selection service 206 selects a particular insertion segment, the multimedia selection service 206 may check whether the selected insertion segment matches a particular format. If the format is not readily available—for example, via a multimedia cache that stores multimedia segments—the multimedia selection service 206 may utilize the transcoder 208 to transcode the insertion segment to the requested format. The transcoded insertion segment may then be made available to the multimedia manipulation service 202, multimedia selection service 206, multimedia cache, or some combination thereof.

In some embodiments, the multimedia manipulation service 202 receives a URL to the selected insertion segment from the multimedia selection service 206. The multimedia manipulation service 202 may obtain the insertion segment via the URL. The URL may reference a mezzanine-quality multimedia segment. A mezzanine-quality multimedia segment may refer to a high quality version of a master file or original copy of multimedia content such that the mezzanine-quality may be utilized to generate multimedia content in various formats of quality lower than the mezzanine-quality multimedia segment. For example, a mezzanine-quality multimedia segment may be used to generate multimedia segments that may be streamed by viewers on mobile devices, handheld devices, tablets, desktop computers, and laptops. Generally speaking, an original copy or master copy of multimedia content may be compressed to a mezzanine-quality format as an intermediate step and then the mezzanine-quality content may be compressed to a format that is suitable for delivery to viewers. The multimedia manipulation service 202 may query a multimedia cache to determine whether a cached version of the mezzanine-quality multimedia segment is available in a particular format. If a cached version is found, the cached segment may be used as part of a multimedia output stream. However, if a cached version in the particular format was not found, the multimedia manipulation service 202 may provide the mezzanine-quality multimedia segment to a transcode which may then transcode the mezzanine-quality multimedia segment to the format and provide it to the multimedia manipulation service 202, multimedia cache, or both. It should be noted that a URL to the mezzanine-quality multimedia segment may be used in place of the mezzanine-quality multimedia segment in various embodiments.

An event-driven compute service 210 may determine when an event occurs and invoke an event-driven function in response to the event being triggered. An event trigger may, for example, be the detection of an insertion segment being provided to the multimedia manipulation service 202. The event-driven compute service 210 may be implemented using software, hardware, or some combination thereof. In some embodiments, distributed computing resources may provision and load custom logic/code in response to the event, run the code, and then unload the code and de-provision the computing resource. The event-driven compute service 210 may be hosted as a component of a data center. An event-driven compute service 210 may be implemented using an event-driven architecture. When an insertion segment is selected by the multimedia selection service 206 or made available to the multimedia manipulation service 202, the event-driven compute service 210 may be notified (e.g., by the component itself or a polling service that monitors the selection of insertion segments) that a multimedia segment has been selected and may be inserted to a particular multimedia stream, determine whether conditions for triggering a segment polisher have been satisfied, and specify custom code or logic that should be run in response to any conditions that are satisfied. In some embodiments, a backend system may have a task scheduler that may be used to schedule periodic tasks. In some embodiments, when an insertion segment is selected by the multimedia selection service 206 or received by the multimedia manipulation service 202, a component programmatically notifies the event-driven compute service that such an event has occurred and the event-driven compute service may receive the notification and schedule a task to invoke the compliance routine 212 at a later time. The event-driven compute service may have access to a repository of event-driven functions (not shown in FIG. 2). The repository may be any suitable storage system and may include hardware, software, and a combination thereof. The event-driven functions repository may be a part of the event-driven compute service 210 (e.g., an in-memory data structure of the event-driven compute service 210). The repository may include an association between trigger conditions to event-driven functions to be invoked upon satisfaction of the associated trigger. The repository may be implemented using a database, data structures such as a map data structure (i.e., an associative array), and any combination thereof. For example, there may exist an association between an event indicating a particular insertion segment has been selected for a particular multimedia source 214 and compliance logic 216 that may be used to determine whether the insertion segment should be used as part of a multimedia output stream. There may also be an association between the customer and the compliance logic 216. When an event is received by the event-driven compute service 210, the event-driven compute service 210 may access the event-driven functions repository and obtain the event-driven function corresponding to the event. For example, in a database, a table may be indexed or sorted using an event identifier as the sorting key. If the repository is implemented as an associative array, the event conditions may be the keys of the array and the event-driven functions may be the values bound to the keys.

Note that in some embodiments, an event-driven function may include large amounts of executable code, and a reference to the code may be included in the database entry, associative array value, etc., so that the executable code is obtainable from the repository via one or more levels of indirection. For example, the database record for the event-driven function may include a uniform resource identifier (URI) that the event-driven compute service may use to request the executable code; for an associative array, the binding value may be a pointer that references the executable code. In some embodiments, a client of the system may create, read, update, and delete event-driven functions from the repository. For example, a customer can provide the compliance logic 216 in the form of executable code, source code, an application, a script, etc., to the event-driven compute service 210, the compliance logic 216 may be stored in a repository of event-driven functions, and the event-driven function may be invoked by the compliance routine 212 under certain conditions. One or more default logics may exist as well—for example, a default logic to verify that the resolution, aspect ratio, frame rate (or some combination thereof) of the multimedia source 214 and the insertion segment are matched may exist in some systems.

After using the event to obtain one or more event-driven function associated with the event, the event-driven compute service 210 may invoke the one or more obtained event-driven functions. In FIG. 2, the event may be triggered by the multimedia manipulation service receiving an insertion segment in the form of a video file, a URL to a mezzanine-quality multimedia segment with metadata indicating a desired encoding format, and the like. The event-driven compute service 210 may receive the event, select one or more event-driven functions that should be invoked in response to the event, and use the compliance routine 212 to invoke the event-driven functions that are appropriate in response to the event.

The compliance routine 212 may be invoked by the event-driven compute service 210 in response to detecting satisfaction of a condition as part of monitoring the multimedia manipulation service 202. The condition may, for example, be detecting that an insertion segment was selected by the multimedia selection service 206 and made available to the multimedia manipulation service 202. In some embodiments, the event-driven compute service 210 detects satisfaction of the condition, retrieves an event-driven function to run (e.g., the compliance logic 216), and provisioning a computing environment to run a routine that includes the event-driven function. The provisioning process may include, for example, initializing a virtual machine instance to run the routine. Upon completion of the event-driven function, the compliance routine may provide an indication as to whether the selected insertion segment is compliant or not compliant. After the compliance routine provides the indication to the multimedia manipulation service, the computing resources (e.g., the virtual machine instance) may be de-provisioned (e.g., the virtual machine instance may be terminated) such that computing resources are made available for other uses, such as other requests in a distributed computing environment.

As a second example of an event-driven architecture, the event-driven compute service 210 may detect satisfaction of a condition, create a new process or thread, and execute the compliance logic 216 on the created process or thread. The process or thread may, upon determining the result of executing the compliance routine, provide the compliance result to the event-driven compute service using various inter-process communication (IPC) techniques, such as the use of remote procedure call (RPC) interfaces. After providing the result, the process or thread may be terminated, releasing computing resources.

Figure 3:
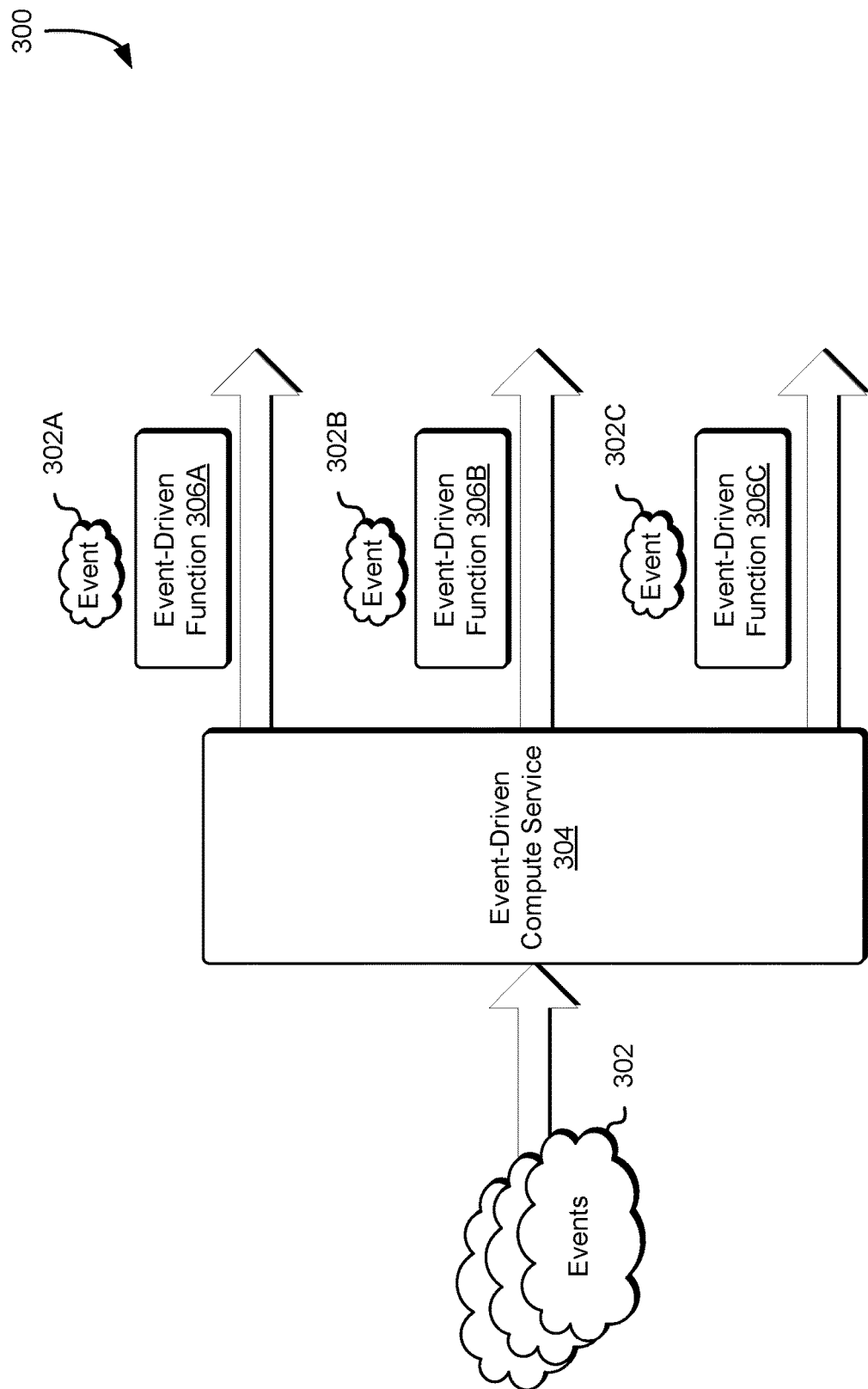
FIG. 3 illustrates an environment in which an event-driven compute service may select from multiple event-driven functions based on the type of transcoding error detected.

FIG. 3 illustrates an environment in which various embodiments can be implemented. The computing environment 300 illustrates an example where an event-driven compute service 304 may be utilized to invoke various event-driven functions. An event-driven compute service 304 may receive and/or monitor events 302 in the manner described above. In some embodiments, the events that the event-driven compute service 304 monitors include the multimedia manipulation service receiving an insertion segment. An event-driven compute service 304 may receive a notification that indicates the multimedia manipulation service received an insertion segment and/or the multimedia selection service provided an insertion segment to the multimedia manipulation service and inspected the notification to determine whether to invoke various types of business logic.

The event-driven compute service 304, which may be implemented in accordance with those described above in connection with FIG. 2, may be further configured to receive events from multiple requests for multimedia streams (e.g., different requests for different broadcasts or different requests for the same broadcast by different users or devices). The event-driven compute service 304 may receive the events 302 and determine, either internally (e.g., using a component of the event-driven compute service) or externally (e.g., by delegating to another service) how to splice the events which may operate on different logics and/or different tables. As an example, the event-driven compute service 304 may include a mapping of event-driven functions to content providers or multimedia input streams.

Event-driven functions 306A, 306B, and 306C may include executable code, source code, applications, scripts, routines, function pointers, input parameters to a routine, callback functions, API requests, or any combination thereof. As an example, the event-driven compute service 304 may include a mapping of compliance routines to events that indicate which routines should be invoked. Invoking a routine may include executing code or providing executable code as part of a request. FIG. 3 shows multiple events 302 that are received by the event-driven compute service 304 and spliced such that a particular event-driven function is run based on the type of error that caused the segment to have degraded quality. The event-driven function 306A that is run in response to a first event 302A may be different from the event-driven function 306B that is run in response to a second event 302B but need not be the case—the event-driven function may, in some cases, be the same either literally (e.g., both events utilize a function pointer that runs the same executable code from memory) or logically (e.g., the same functional outcome). In some cases, the event-driven function may use information included in the events 302A, 302B, and 302C to perform a workflow.

Figure 4:
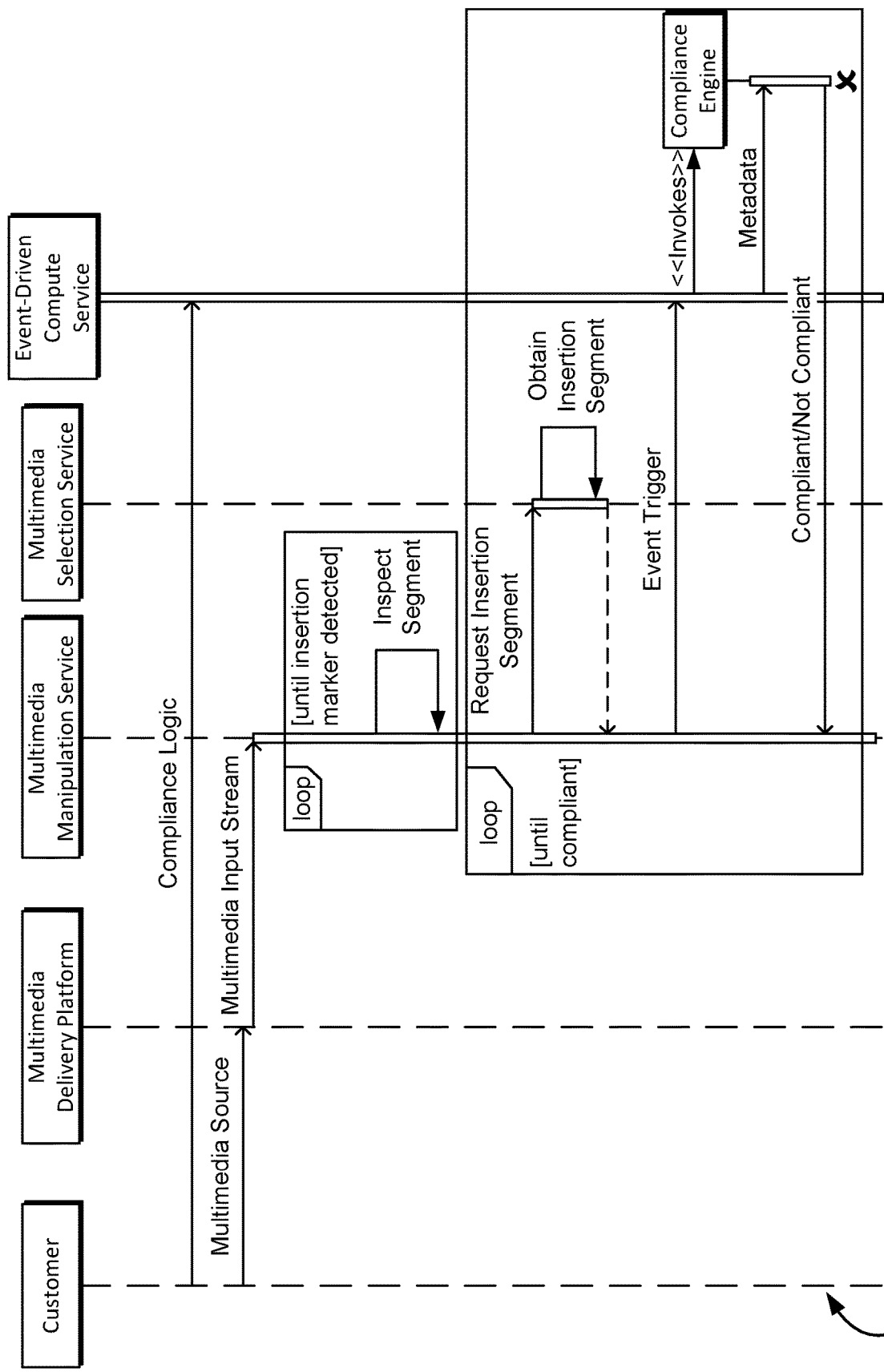
FIG. 4 illustrates a diagram in which insertion segments are selected.

FIG. 4 illustrates a sequence diagram 400 in accordance with various embodiments discussed above in connection with FIGS. 1-3. The components shown in FIG. 4 may be in accordance with those described elsewhere in this disclosure. In some embodiments the customer may provide compliance logic to an event-driven compute service, for example, through an application programming interface (API) command. Executable code, source code, scripts, macros, parameters, etc., may be transmitted to the event-driven compute service via the API command. The customer may also provide a multimedia source to a multimedia delivery platform. In some embodiments, the multimedia source is provided to a transcoder, the source is transcoded, and a transcoded version of the multimedia source is made available to the multimedia delivery platform. The multimedia source may be spliced into one or more multimedia segments as part of a transcoding process. The multimedia delivery platform may receive the multimedia source (or a transcoded version of the source) and provide the source content as a multimedia input stream to the multimedia manipulation service. Segments of the multimedia source may be provided to the multimedia manipulation service as part of a continuous stream of segments.

Upon receiving a segment, the multimedia manipulation service may obtain a manifest associated with the segment and inspect the segment for an insertion marker. Generally speaking, the multimedia manipulation service may be configured to detect any indication that insertion of multimedia is appropriate. This process may be repeated until a segment having an insertion marker is detected.

Upon detection of an insertion marker, the multimedia manipulation service may make a request to a multimedia selection service requesting an insertion segment. The request may include metadata such as metadata about a user requesting the media content, metadata about the multimedia input stream, and more. The multimedia selection service may receive the request and select an insertion segment based at least in part on metadata provided (e.g., as part of the request). In some embodiments, the multimedia selection service queries a backend database that includes additional information that may be used to select an insertion segment. The selected insertion segment, or a reference to the selected insertion segment (e.g., a URL to the segment) may be provided to fulfill the request made by the multimedia manipulation service.

Upon receiving the selected insertion segment, the event-driven compute service may receive an indication that the multimedia manipulation service received an insertion segment as well as metadata regarding the multimedia input stream, metadata regarding the insertion segment, etc. The event-driven compute service may be a background service that monitors and detects the occurrence of conditions that are used to trigger event-driven functions. The event-driven compute service may select a compliance logic based at least in part on the metadata, and perform the compliance routine. Computing resources for the compliance routine may be initialized and managed by the event-driven compute service. The compliance routine may receive some or all of the metadata from the event-driven compute service and determine, based at least in part on the metadata, whether the selected insertion segment satisfies one or more compliance criteria. The compliance routine may provide an indication of whether the selected insertion segment is compliant to the multimedia manipulation service, for example, in the form of an asynchronous callback. In some embodiments, the compliance routine provides the indication to the event-driven compute service, which may use a notification framework to provide the indication of compliance (or non-compliance) to the multimedia manipulation service. After performing the compliance routine, the compliance routine may be de-initialized by the event-driven compute service.

Figure 5:
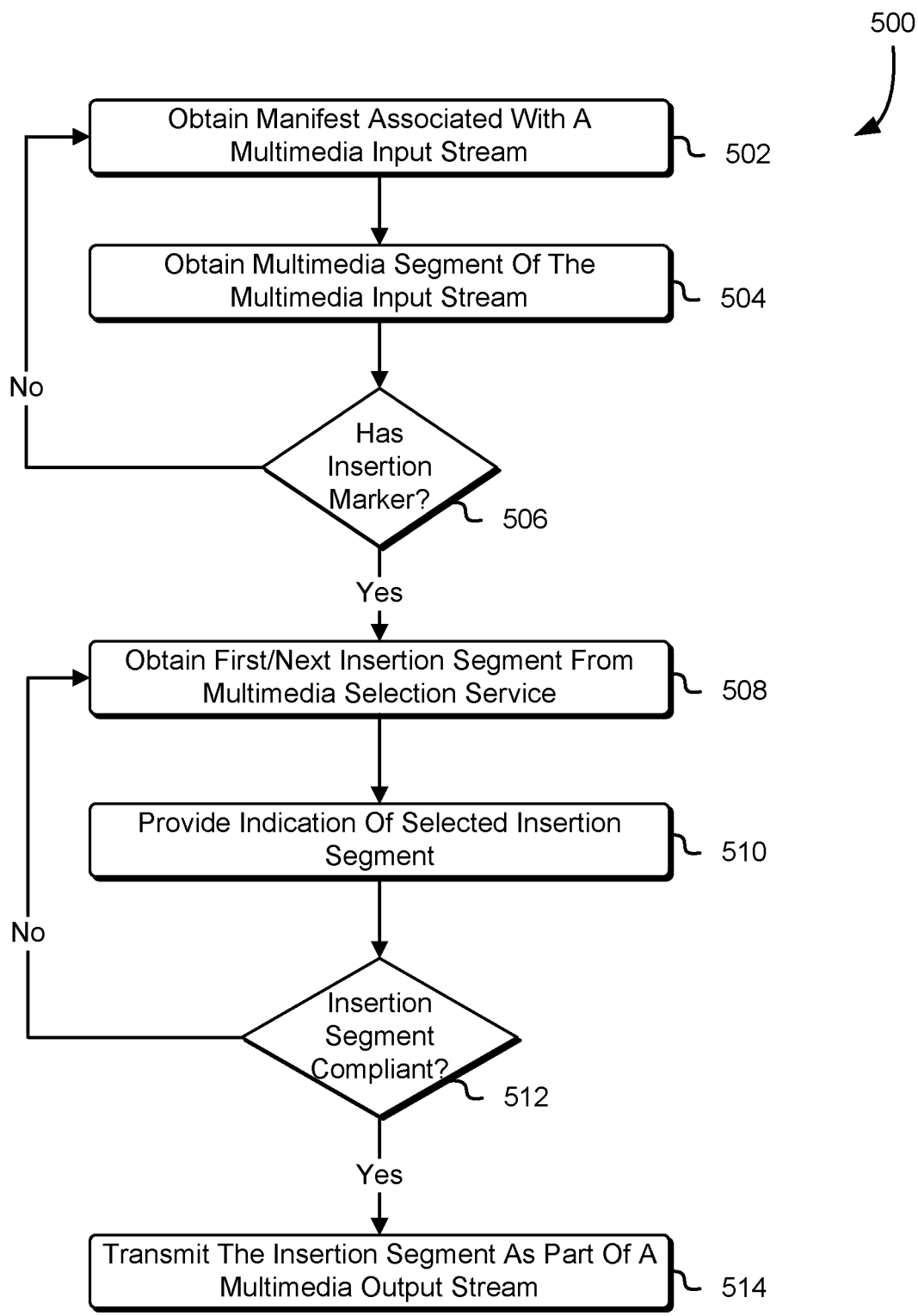
FIG. 5 illustrates a process for dynamically generating a multimedia stream from multiple sources.

FIG. 5 shows an illustrative example of a process 500 that may be used to dynamically generate a multimedia output stream from two or more sources. Generally, the process 500 may be performed by any suitable system such as multimedia manipulation services described elsewhere in this disclosure. The system performing the process 500 may use hardware, software, or a combination thereof to perform the process. In some embodiments, the process may be performed in a distributed environment, such as on a virtual machine instance running on a server that is in a data center configured to fulfill requests from multiple requestors (e.g., clients of the data center or service provider).

In an embodiment, the process 500 includes obtaining 502 a multimedia segment from a multimedia input stream. The multimedia input stream may be received from a multimedia delivery platform such as those described in connection with FIG. 1. The multimedia input stream may be in accordance with various standards and protocols such as the HTTP Live Streaming (HLS) protocol. In various embodiments, the multimedia input stream may be represented by multiple multimedia segments having corresponding manifest files. The manifest files may include various metadata information of the associated multimedia segment, including encoding format, a sequence number, an insertion marker and so on. The system may inspect segments of an input stream as they arrive to determine whether an insertion is indicated.

The system may obtain 504 a manifest associated with the obtained segment. Generally speaking, a manifest may be associated with a multimedia segment. In some embodiments, the manifest may be a file that is in accordance with various standards and protocols. For example, a manifest described in connection with FIG. 5 is in accordance with the M3U8 manifest format specified for HLS. A manifest may include metadata associated with a multimedia segment such as a sequence and a bitrate. The sequence may refer to the temporal sequence in which the segment is played relative to other sequences. For example, if a sequence is a numerical value with value zero, that indicates the particular segment is the first segment and that the next segment that should be downloaded and played is the segment having a sequence value of one, and then the segment having a sequence value of two, and so on. The bitrate may be used to determine which, among various streams, to select based on the available bandwidth to a playback device. A playback device may estimate its bandwidth and select the highest bandwidth that the bandwidth can accommodate.

The manifest may include an indication of an insertion marker. For example, a manifest in accordance with the HLS protocol may include an EXT-X-DISCONTINUITY tag that indicates the segment following the segment associated with the manifest file should be an insertion segment. The manifest may include information regarding the duration (e.g., specifying the insertion segment should be 30 second long), a maximum duration (indicating the insertion segment should be at most 30 seconds long), and so on. In some embodiments, the manifest and the associated segment may be received at different times. It should be noted the system may sometimes obtain 504 the manifest prior to and/or independent of obtaining the multimedia segment from the multimedia input stream, and that the ordering shown in FIG. 5 is merely illustrative of one of many example implementations.

The system may check 506 whether the obtained manifest has an insertion marker. As noted above, an EXT-X-DISCONTINUITY tag in accordance with the HLS protocol may be used as an insertion marker. In general, any indication that content from a second multimedia source should be inserted to a multimedia input stream may be used as an insertion indication. While examples discussed herein discuss using the manifest to determine whether an insertion marker exists, some embodiments use an insertion indication embedded in the multimedia input stream itself to determine whether an insertion segment is needed. In an embodiment, the system may obtain a multimedia segment from a multimedia input stream, detect an audio and/or visual pattern, and determine that an insertion segment is needed. For example, in a television broadcast, the detection of a black slate for a predetermined period of time (e.g., 100 milliseconds) may be used to indicate that an advertisement segment should be inserted.

If the system determines that is no insertion marker, cannot find an insertion marker, or otherwise determines that a segment should not be inserted, the system may continue to monitor segments of the input segment such as in the manner described above in connection to step 502. However, if the system detects an insertion marker (e.g., via an inspection of a manifest), the system may obtain 508 an insertion segment from the multimedia selection service. The multimedia selection service may be in accordance with those described elsewhere in this disclosure. As part of the process 500, the system may make a request to the multimedia selection service requesting an insertion segment. The output of the request may be an insertion segment or reference to the insertion segment. The input of the request may include metadata regarding the multimedia input stream and metadata regarding the requestor of the content. Metadata regarding the multimedia input stream may include the type of broadcast (e.g., romance, comedy, action), whether the broadcast is a live broadcast, the sequence number of the segment indicating the insertion marker, a customer associated with the content, and so on. Metadata regarding the requestor of the content may include a username, ratings information related to the requestor, the type of device the requestor is requesting the content for, geolocation of the requestor, IP address of the requestor, and so on. Metadata may, generally, be provided to the multimedia selection service and may be used to select an insertion segment. The request may, furthermore, specify one or more parameters for the insertion segment. For example, the parameters may specify the resolution, aspect ratio, frame rate, etc., for the insertion segment that is to be provided in response to the request. In some embodiments, the parameters may also include the expected length of the insertion segment (e.g., the insertion segment should be 30 seconds long) or a range of lengths of the insertion segment (e.g., the insertion segment should be 30-90 seconds long).

In some embodiments, the system receives the selected insertion segment or a URI of the insertion segment from the multimedia selection service and then provides 510 an indication of the selected insertion segment to an event-driven compute service such as those described elsewhere in this disclosure. The system may provide the indication of the selected segment in any suitable manner. For example, the system may provide a message to the event-driven compute service that indicates an insertion segment has been selected, a URL to the selected insertion segment, a URL to the multimedia input stream, additional metadata regarding the multimedia input stream (such as the content provider), video format information of the stream and/or selection segment (e.g., resolution, aspect ratio, frame rate), and additional information such as the expected duration of the insertion segment, which may have been specified in a manifest file. In some embodiments, the system (e.g., the multimedia manipulation service) does not provide the indication to the event-driven compute service, but rather, the event-driven compute service monitors when the system receives insertion segments from the multimedia selection service.

The system may receive an indication of whether 512 the selected insertion segment satisfies one or more compliance rules. The indication may be provided via a compliance routine invoked by the event-driven compute service in response to the indication that an insertion segment was provided to the system by a multimedia selection service. In some embodiments, an event-driven compute service detects an insertion segment has been selected and selects a compliance logic from a repository of event-driven functions. The selected compliance logic may be based at least in part on the multimedia input stream and may be associated with the customer that provided the multimedia input stream. In some embodiments, an identifier associated with the customer may map to one or more compliance logics. The compliance logics may be retrieved by the event-driven compute service which then invokes a compliance routine to run based on the obtained compliance logic. An example process for determining whether an insertion segment is compliant is discussed in greater detail below, in connection with FIG. 6.

If the system receives an indication that the selected insertion segment is not compliant or otherwise inappropriate, the system may obtain another insertion segment from the multimedia selection service. As part of making the request, the system may indicate one or more insertion segments that should not be provided in response to the request. The request may include a list of one or more insertion segments that were previously determined to not satisfy one or more compliance criteria. These steps 508-512 may be repeated until a compliant insertion segment is retrieved. Once a suitable insertion segment is found, the insertion segment may be transmitted 514 as part of a multimedia output stream which may be made available to a downstream entity such as a CDN or a multimedia playback device of the viewer requesting the multimedia content.

In some cases, a compliant insertion segment may not be found and various steps may be taken depending on the circumstances. For example, if the insertion segments are advertisements to be shown during a program, the program may resume without an advertisement. In contrast, if the insertion segments are specific scenes of a movie (e.g., the "car chase" scene discussed above), an error may be provided and/or logged.

Figure 6:
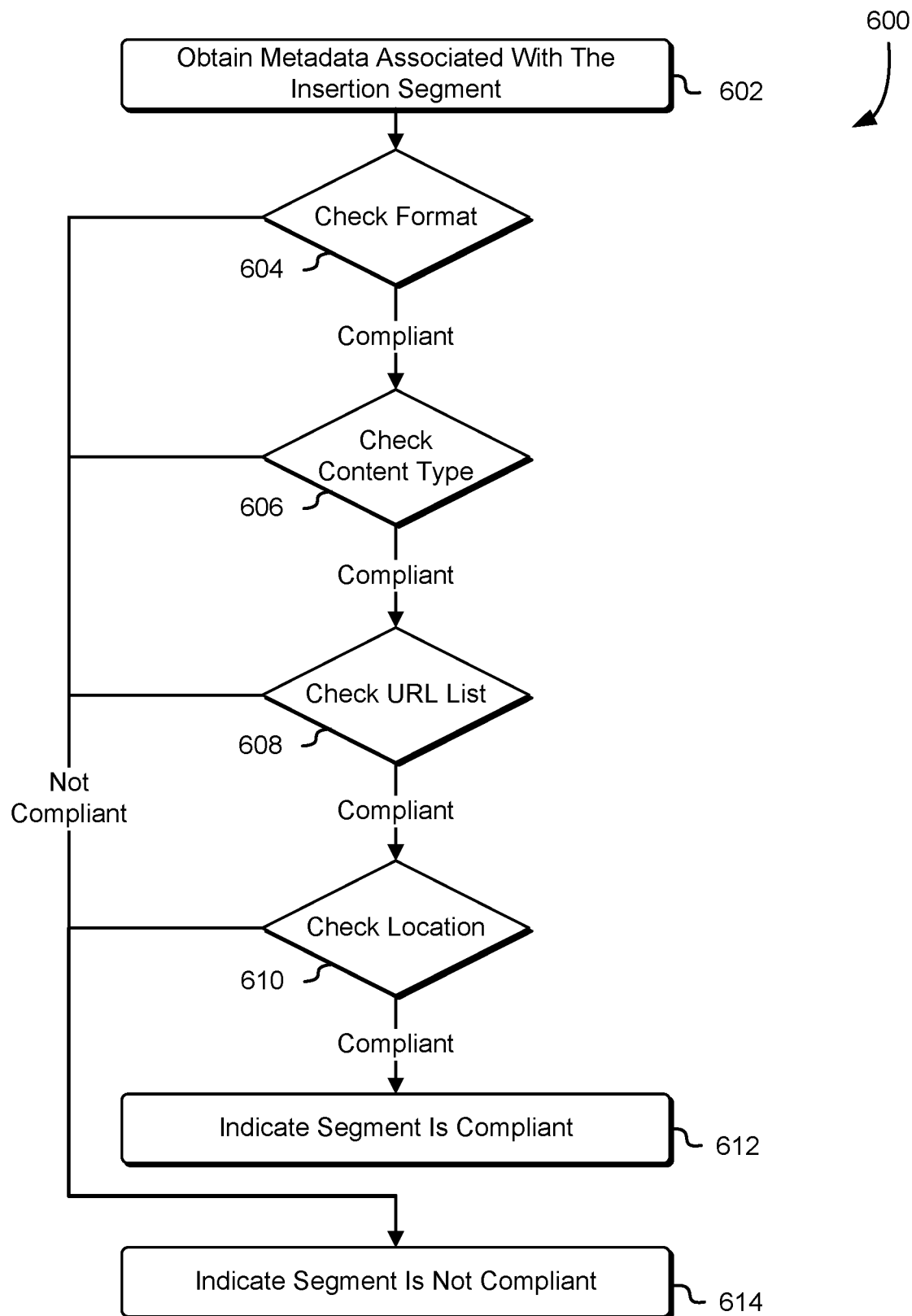
FIG. 6 illustrates a process for determining the compliance of an insertion segment based on customized compliance logic.

FIG. 6 shows an illustrative example of a process 600 that may be used to determine whether a selected insertion segment is compliant. Generally, the process 600 may be performed by any suitable system, and may be performed in the context of an event-driven architecture as described above, such as in connection with FIGS. 2-3. The system performing the process 600 may use hardware, software, or a combination thereof to perform the process. In some embodiments, the process may be performed in a distributed environment, such as on a virtual machine instance running on a server that is in a data center configured to fulfill requests from multiple requestors (e.g., clients of the data center or service provider).

In some embodiments, the process 600 is performed in response to detecting an insertion segment that was selected by a multimedia selection service and provided to a multimedia manipulation service. An event-driven compute service may monitor and detect the selection of an insertion segment for a particular multimedia input stream. The event-driven compute service may further select, based on various metadata, a compliance logic that may be invoked to determine whether the insertion segment is compliant within the particular operating context. A selected insertion segment may be compliant and appropriate in some circumstances but not compliant and inappropriate under other circumstances.

The system may obtain 602 metadata in connection with the insertion segment. The system may obtain metadata associated with the insertion segment, metadata associated with the multimedia input stream, metadata associated with the requestor, and any combination thereof. In some embodiments, the system may receive information that is usable to obtain one or more different types of metadata. For example, in some embodiments, the system may receive a token associated with the requestor, and the token is used to obtain information about the requestor such as the requestor's age, ratings history, and more. Metadata associated with the insertion segment may include resolution, aspect ratio, frame rate, bit rate, etc., associated with the insertion segment, a URL or other identifier that may be used to obtain the insertion segment, metadata regarding the content type, duration of the insertion segment, and more. Metadata associated with the multimedia input stream may include resolution, aspect ratio, frame rate, bit rate, etc., associated with the stream, a URL or other identifier associated with the stream, metadata regarding the content type, and the like.

FIG. 6 further illustrates examples of various compliance criteria. The system may check 604 the format of the insertion segment. Checking the format of the insertion may include verifying that one or more properties of the insertion segment match those of the multimedia input stream. For example, the system may verify that the resolution, aspect ratio, frame rate, bit rate, or some combination thereof matches those of the multimedia input stream. The system may check 606 the content type of the insertion segment. The content type may refer to a classification of the insertion segment which may be based on various properties such as an advertisement type (e.g., car ad, cell phone ad, pharmaceutical ad, cigarette ad). Various compliance rules may be used, such as a rule that a certain type of advertisement may not be shown during certain hours or in connection with certain programming. For example, a multimedia input stream may have a content type that indicates it is children's broadcasting and a compliance rule requires that cigarette advertisements are not to be played during children's shows. The system may check 608 a URL list. A compliance rule may include a list of URLs that indicate a set of sources from which insertion segments should not be used. For example, a compliance rule may state that once one advertisement for a product is played during a broadcast that advertisements for competitors' corresponding products should not be played for the remainder of the broadcast. The system may check 610 the geolocation or other information associated with the viewer that requested the content. Certain types of content may be appropriate in some locales but not in others. For example, an insertion segment may correspond to one among several version of a scene for a film. In some locales, a compliance routine may determine that a visual scene or depiction is not appropriate (e.g., depiction of certain types of nudity and/or violence). For example, a locale may have regulations prohibiting the depiction of skulls and skeletons. An insertion segment may include, as metadata, a flag that indicates whether the scene depicts skulls and skeletons. The compliance routine may check whether the viewer is from the applicable locale and check whether the flag of the selected insertion segment is set. In this way, the system may be used to verify that the multimedia output stream complies with local regulations.

In some embodiments, different and/or additional compliance criteria may exist. For example, in some cases, compliance criteria may include making multiple determinations such that the satisfaction of a compliance criterion may be based on multiple factors. As an example, a compliance criterion may include determining a set of information that includes the geolocation of the requestor, the content type of the insertion segment, and the time of day—some governments have regulations regarding the type of content that may be shown during particular times of the day. For example, a regulation may pertain to prohibiting content regarding adult activities (e.g., tobacco and alcohol related activities) from being shown except during particular hours of the night. A compliance criterion may be utilized to verify the content type of an insertion segment (which may be obtained from metadata tagged to the insertion segment), the content regulations pertaining to the location that the viewer requests the content from (which may be determined based on an IP address or profile information that the viewer provides as part of the viewer's account information), and the time of day (which may be determined based on system's own internal clock for determining the current UTC time and performing any applicable timezone related adjustments based on the viewer's location).

If all compliance checks are satisfied, the system may indicate 612 that the insertion segment is compliant and may be used. The indication may be in the form of a notification or message to the multimedia manipulation service that the insertion segment is compliant. Conversely, if any of the checks fail, the system may indicate 614 using the same or similar mechanisms that the segment is not compliant with the compliance criteria. A system such as the multimedia manipulation service may, in response to receiving an indication that the selected insertion segment is not compliant, obtain a different insertion segment and perform the process 600 again until a selected insertion segment is in compliance with the compliance criteria.

Figure 7:
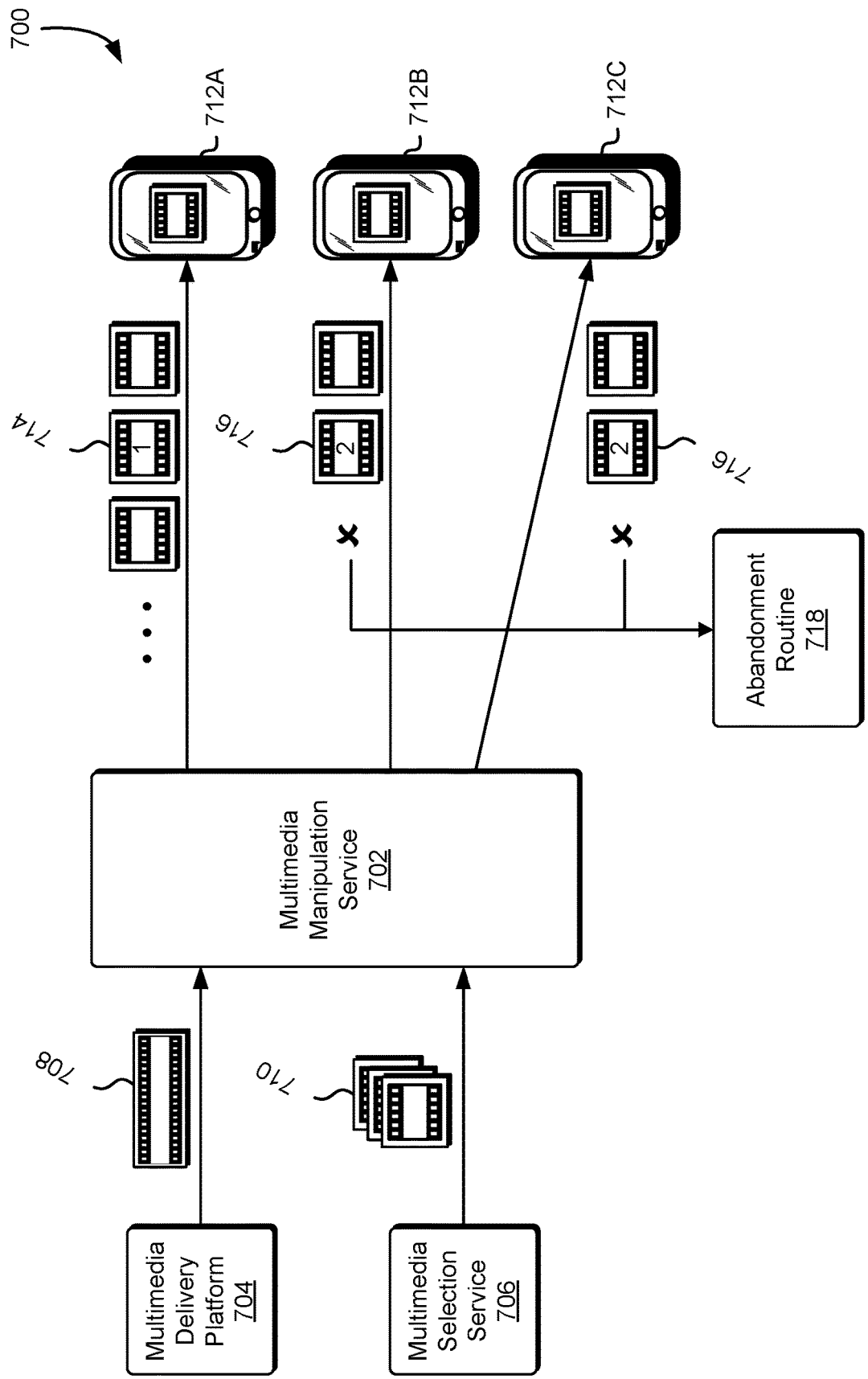
FIG. 7 illustrates an environment in which multimedia streams are abandoned.

FIG. 7 illustrates an environment in which various embodiments can be implemented. The computing environment 700 illustrates an environment in which abandonment routine is used to track and notify the occurrence of stream abandonments. In various embodiments, a viewer will request multimedia content which is provided to the viewer via a multimedia stream. The stream may be transmitted to a multimedia playback device of the viewer, which the viewer uses to consume the content. Many times, a viewer will consume the entire content (e.g., watch a movie to completion). Occasionally, a viewer may abandon the stream by terminating the stream prior to completion. Information regarding the abandonment of the stream may be logged and utilized to determine the context surrounding the termination, and the information may be used to identify technical issues with a stream, improve the selection of insertion segments, and determine the quality of multimedia.

The environment 700 shown in FIG. 7 includes a multimedia manipulation service 702; multimedia delivery platform 704; multimedia selection service 706; multimedia playback devices 712A, 712B, and 712C; and abandonment routine 718. The multimedia manipulation service, multimedia delivery platform, and multimedia selection service may be in accordance with those described elsewhere in this disclosure. The manifest manipulation service may receive multiple requests for multimedia content from multiple requestors, and multiple streams may be dynamically generated from multiple sources using techniques described above in connection with FIGS. 1-6. For example, a multimedia stream that is provided to a first device 712A may include a first insertion segment 714, whereas the multimedia stream provided to a second device 712B may include a second insertion segment 716. As yet another example, a third multimedia stream provided to a third device 712C may also include the second insertion segment 716. As shown in FIG. 7, insertion segments need not be unique to a particular multimedia playback device. In some embodiments, the insertion segments may correspond to advertisements.

In some embodiments, each of the devices 712A, 712B, and 712C are provided multimedia content that includes the same multimedia input stream in addition to the insertion segments 714 and 716 shown in FIG. 7. For example, the same television show may have been requested by each device. As discussed above, insertion segments (e.g., advertisements) may be dynamically inserted to an output stream based on various types of metadata. In FIG. 2, it may have been determined that a first advertisement is appropriate and compliant in connection with the first device 712A and a second advertisement is appropriate and compliant in connection with the second device 712B and third device 712C. In some embodiments, a multimedia selection service provides 706 insertion segments 710 to the multimedia manipulation service 702 and a multimedia delivery platform provides a multimedia input stream 708 to the multimedia manipulation service 702. A multimedia output stream may include the multimedia input stream and one or more insertion segments (e.g., a stream of a television show with one or more dynamically selected advertisements).

In some embodiments, a system may be configured multimedia output streams. As an example, in FIG. 7, three different viewers may be using the multimedia playback devices to watch the same broadcast—however, the insertion segments provided to the viewers may be different (e.g., the viewer of the first device 712A may see a first advertisement and the viewer of the second device 712B may see a different advertisement). The first viewer may continue watching the broadcast following the advertisement shown to him/her (represented by the three dots shown in FIG. 7). However, the second viewer may abandon the broadcast at some point in time. For example, in FIG. 7, the viewer of the second device 712B abandons the broadcast after the second advertisement was transmitted and shown to the viewer—likewise, the viewer of the third device 712C also abandons the broadcast after the second advertisement was transmitted. When a stream is abandoned, abandonment routine 718 may be invoked, for example, using an event-driven compute service.

Abandonment of a stream may be detected by various components in a system. For example, in some embodiments the manifest manipulation service 702 establishes a communication session with the downstream entity (e.g., the playback device). A communication session may involve a connection between the entities that has a defined start (e.g., through performing a handshake process) and a defined end (e.g., through performing a teardown process). Termination of a communication session that is used to transmit/receive a stream may indicate abandonment of the stream. As a second example, in a connectionless model, a recipient such as a multimedia playback device may continuously request segments of a broadcast as the broadcast is being consumed by the viewer and halt the issuance of requests for additional segments when the stream is abandoned. The multimedia manipulation service may detect abandonment of stream. In other embodiments, a different component such as the multimedia delivery platform 704 may detect abandonment of the stream (e.g., based at least in part on detecting that the multimedia input stream is not needed prior to completing transmission of an entire broadcast).

In some embodiments, abandonment routine 718 is invoked in response to detecting that a stream was abandoned. The abandonment routine may be invoked in response to detecting satisfaction of a condition related to a stream ending prematurely (e.g., before the entire contents have been transmitted to a requestor). The abandonment routine 718 may record that the abandonment occurred, metadata surrounding the abandonment, and may be used in conjunction with the multimedia delivery platform 704, multimedia selection service 706, and multimedia manipulation service 702 to affect multimedia output streams delivered to playback devices.

In some embodiments, abandonment events may be used to troubleshoot errors that occur as part of serving multimedia streams to viewers. For example, consider an environment in which two or more viewers request a particular multimedia content (e.g., a movie or television show). The requests may originate from various geolocations, by various users/viewers, at various times, in various encoding formats, etc. If, in the example, there is an abnormally high rate of abandonment for a particular encoding format at a particular point in time (or within a range of times) of the content, it may indicate that there is a technical error related to the encoding format. As a second example, if there is an abnormally high rate of abandonment for all streams requested by users of a particular geolocation at a certain point in time, it may indicate that there is a technical error related to the connection with users of that particular geolocation. As another example, if there is an abnormally high rate of abandonment for streams of a particular multimedia content following segments that include metadata tagging the segments with a particular property, an indication may be made attributing the abandonment to the multimedia content—for example, users that request to watch a comedy movie may abandon the movie at an abnormally high rate following specific segments that are tagged to include violence. An indication may be made attributing abandonment of the movie to the violent scenes included in the movie.

In some embodiments, abandonment may be attributed to insertion segments. For example, consider an embodiment in accordance with FIG. 7 where the multimedia input stream is a television program and the insertion segments are advertisements. A quality control service may detect an abnormally high rate of abandonment in the television program after the second advertisement is shown but not when the first advertisement is shown. The quality control service may indicate to the multimedia selection service that the second advertisement should not be served and/or not served in conjunction with the particular television program. Thus, if a fourth viewer of a fourth multimedia broadcast device (not shown in FIG. 7) requested to view the same multimedia input stream 708, the multimedia selection service may determine the second advertisement should not be selected as the insertion segment and/or the multimedia manipulation service 702 may receive the second advertisement and refuse to dynamically insert it into the output stream based on a set of blacklisted insertion segments that the multimedia manipulation service 702 retains (e.g., as a data structure in RAM).

Continuing with the previous discussion, consider a second example where a viewer requests to watch the same television show and advertisements are dynamically inserted to an output stream that is served to the viewer. A viewer may receive, as part of an output stream, two or more advertisements that are consecutively inserted (e.g., a television show cuts to a first advertisement, a second advertisement, etc., and then the show resumes). Abandonment following a particular advertisement segment may be used to determine how long viewers are willing to be served advertisements and/or how many advertisements viewers are willing to be served before abandoning the stream. In these cases, a quality control service may tune the number of ads to serve in coordination with the various components shown in FIG. 7. Additionally, there may be logic that attributes the abandonment differently based on the context. For example, consider an embodiment that extends FIG. 7 where a fourth viewer requests the same content and receives a set of advertisements as insertion segments. While the first, second, and third viewers discussed in connection with FIG. 7 are each served a single advertisement, the fourth viewer may be served two or more consecutive advertisements, such that the viewer, after watching several ads or after a certain period of time, abandons the stream while the first advertisement is being shown. The system may attribute such an abandonment to how long or how many advertisements were shown rather than attributing the abandonment to the first advertisement. In some embodiments, attribution of abandonment may be non-binary such that the attribution is weighted to multiple factors.

An abnormally high rate of abandonment may refer to a determination that the rate of abandonment for a set of streams is of a rate that is higher than the rate of abandonment of a control group that includes the set of streams. The difference may, additionally, be statistically significant based on various statistical models such as determined by applying F-tests and T-tests to the data set used to calculate the rates described above. Various statistical models may be used to determine whether a rate difference is considered abnormal, such as statistical models using analysis of variance (ANOVA) techniques. The quality control service described above may be implemented as a separate service in a distributed system. It may also be implemented as a component or subsystem of those described in this disclosure. For example, the quality control service may be implemented as an event-driven function that is invoked by an event-driven compute service, may be implemented as part of a multimedia manipulation service, and may be implemented as part of an abandonment routine.

Figure 8:
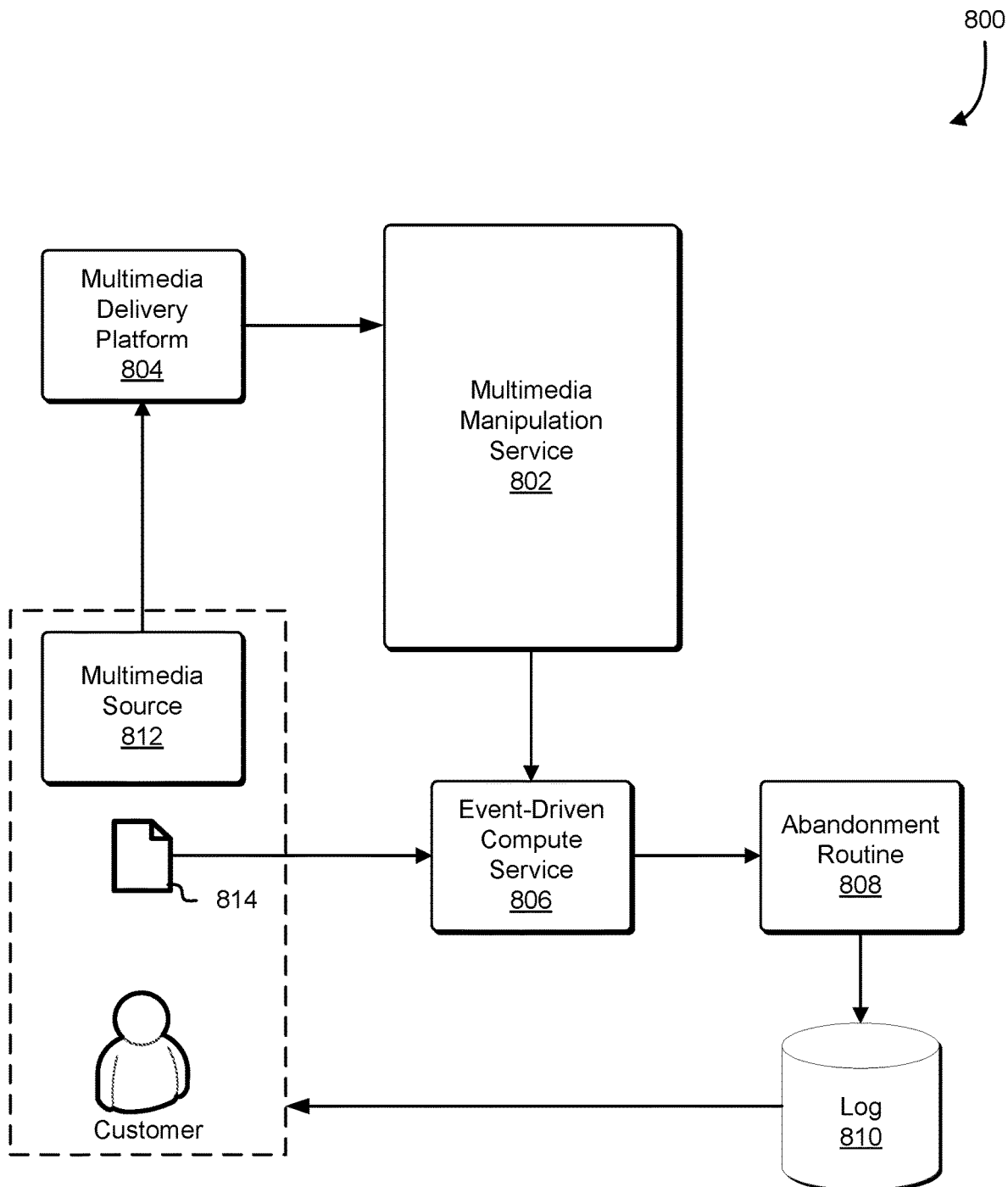
FIG. 8 illustrates an environment in which an abandonment routine can be implemented in conjunction with an event-driven compute service.

FIG. 8 illustrates an environment in which various embodiments can be implemented. The computing environment 800 illustrates an environment in which abandonment logic may be used in conjunction with an event-driven compute service to track and notify the occurrence of stream abandonments. The environment 800 includes a multimedia manipulation service 802; a multimedia delivery platform 804; an event-driven compute service 806; abandonment routine 808; and a logging system 810. In the environment 800, a customer may provide a multimedia source 812 to the multimedia delivery platform 804 and event-driven function 814 to the event-driven compute service 806.

The multimedia manipulation service 802 may be in accordance with those described elsewhere in this disclosure. For example, the manifest manipulation service may receive a multimedia input stream and an insertion segment that is dynamically selected based on context information (e.g., metadata associated with the multimedia input stream) and provide segments from both the input stream and the insertion segment to a multimedia playback device as part of a multimedia output stream. The multimedia manipulation service 802 may be further configured to detect abandonment of a stream. In some embodiments, an entity (e.g., a multimedia playback device described in connection with FIG. 7) may make a request for multimedia content. In response to the request, the multimedia manipulation service 802 may obtain the multimedia input stream, insertion segments, and dynamically generate an output stream for the requestor based on the input stream and the insertion segments. The multimedia manipulation service 802 may be further configured to receive, at a later time, a termination request indicating that segments of the output stream should no longer to transmitted to the requestor.

In some embodiments, the multimedia manipulation service 802 receives a request for multimedia content from an entity and provides some but not all output segments to the requestor in response to the request. The request may encode information that specifies the number of segments to provide. Additional requests may be made by the requestor indicating that additional segments of the output stream should be transmitted. In this way, a requestor may obtain a set of output segments, serve them to a viewer, and request additional segments while the viewer is watching the earlier segments, thereby creating a smooth streaming experience which reduces or eliminates buffering.

The multimedia manipulation service 802 may detect abandonment of a stream. In various embodiments, detection of the abandonment of the stream may occur in various ways. For example, in the case where a stream is terminated with an explicit transmission from the requestor (e.g., a termination request) receiving the transmission may be the detection of the condition. In other cases, the multimedia manipulation service 802 detects that a requestor who previously requested some segments of an input has not requested additional segments—for example, a stream may include 100 segments that are sequenced from 1 to 100, and the multimedia manipulation service 802 may transmit the segments in blocks of 10 where a requestor specifies when to deliver the blocks. In such an embodiment, the system may detect that the requestor abandoned the stream part way through based on not receiving a request for all of the blocks (i.e., less than all the segment blocks were requested by the requestor).

The multimedia delivery platform 804 may be in accordance with those described elsewhere in this disclosure. The multimedia delivery platform 804 may be configured to provide a multimedia input stream to the multimedia manipulation service 802. In some embodiments, a request for content from a playback device is transmitted to and received by the multimedia manipulation service 802, and the multimedia delivery platform 804 provides a multimedia input stream corresponding to the requested content. For example, the requested content may be a television program, and the multimedia input stream may be a transcoded version of the television program. In some embodiments, a multimedia selection service may be in accordance with those described elsewhere in this disclosure and may be used to obtain insertion segments. Continuing with the example, the insertion segments may be advertisements that are customized based on the requestor's tastes and dynamically inserted into an output stream along with the multimedia stream.

The event-driven compute service 806 may be in accordance with those described elsewhere in the disclosure. Generally speaking, an event-driven compute service may be utilized to detect satisfaction of a condition and invoke a customized routine. In some embodiments, the event-driven compute service 806 is configured to detect abandonment of a stream and execute an abandonment routine 808. The abandonment routine 808 may be provided by a customer and may be in accordance with event-driven functions discussed above—for example, the event-driven function may be in the form of executable code, source code, scripts, etc. The abandonment routine may, for example, record metadata regarding segments that were being shown to a viewer prior to or in the temporal proximity of when the viewer abandoned the stream. For example, the metadata may include an identifier corresponding to the multimedia input segment and information regarding the frames that were shown when the viewer abandoned the stream. In some embodiments, such as those in which insertion segments are part of an output stream, the metadata also indicates whether an insertion segment was being shown at or around the time the viewer abandoned the stream.

In some embodiments, the event-driven compute service 806 detects abandonment of a stream and invokes the abandonment routine 808 to perform various routines such as recording metadata surrounding the stream abandonment. The abandonment routine may record the metadata associated with the detected abandonment to a logging system 810. For example, a computing resource service provider may include a service that provides multimedia content to clients (e.g., viewers), and a telemetry service may record, to a storage service, metadata such as a timestamp and an associated web API request when a client requests a multimedia stream, when a client switches from one multimedia stream to another, when a client terminates a stream (e.g., based upon the service having first received requests for a first part of a multimedia stream and then not receiving requests for subsequent parts of the multimedia stream based on a time out). The logging system 810 may be implemented using a database or other suitable storage and retrieval system. In some embodiments, when a viewer abandons a stream, the abandonment event is detected by the event-driven compute service 806. The abandonment routine may receive information regarding the circumstances surrounding the abandonment, such as which segments were transmitted to the requestor of the stream. Some or all of the metadata may be stored to a database or other suitable data storage mechanism using the logging system 810. The logging system 810 may store information regarding the abandonment of other streams as well. As illustrated in FIG. 8, two different abandonments by two different streams may be recorded in the logging system 810.

The logging system 810 may be used to store abandonment data and determine the health and quality of segments that are served to viewers. For example, abandonment data may be aggregated over time and determinations can be made as to the subjective quality of segments. For example, the event-driven compute service detects when a stream is abandoned and invokes an abandonment routine that records the absolute time of the abandonment (e.g., the UTC date and time), a relative time of when the stream was abandoned (e.g., at what point in time after the stream began did the abandonment occur), identifiers for the segments that were transmitted at the time of abandonment (e.g., sequence numbers for the last several segments that were transmitted). In some embodiments, the abandonment routine also logs the segment source (e.g., whether a segment is from an input stream or is an insertion segment). Metadata about segment contents may also be logged—for example, whether a frame or set of frames includes violence, vulgar language, etc. Metadata about the viewer may also be logged—for example, demographic information of the viewer (e.g., age, gender, ethnicity), rating information (e.g., ratings for other movies or television shows). A rating for a program may be a numeric range (e.g., one to five stars) and may also be non-numeric (e.g., a "Like", a "Love") and may generally be any indication of favorability (e.g., sharing a link to the program and including a favorable or unfavorable impression of the content).

Data recorded in the logging system 810 may be used in a variety of ways. For example, the data recorded in the logging system 810 may be aggregated over time and used to determine information regarding the quality of particular segments. The rate of abandonment of a stream may be linked to particular segments. A customer may receive a notification when abandonment exceeds a certain threshold rate, including metadata regarding the abandonment and the rate. For example, logged data may indicate that abandonment occurs at a higher rate than normal following a particular segment or set of segments and a customer may be notified. As a result, the customer may determine that a particular scene of a movie or television show may be of a poor quality, may be disliked by the viewing audience, etc., and take appropriate action. For example, if the customer is a movie studio, the customer may re-shoot a particular scene. As a second example, a customer may utilize techniques described above in connection with insertion segments by: determining a heuristic that identifies a set of viewers that are likely to abandon the stream based on the original content, making an insertion segment available to a multimedia selection service; and utilizing the multimedia manipulation service to dynamically generate output streams for the identified viewers that includes the insertion segments in place of the segments of the input stream that were associated with the abandonment event.

A customer may provide the multimedia source 812 to the multimedia delivery platform 804 and provide event-driven function 814 to the event-driven compute service, which is invoked when abandonment of a stream is detected.

It should be noted that while the environment 800 shown in FIG. 8 includes various components and subsystems, there are various embodiments which may be implemented that may have fewer, more, or different components. For example, an embodiment may include a multimedia selection service, and the output stream provided to viewers may include one or more insertion segments such as one or more insertion segments that are consecutive to each other.

Figure 9:
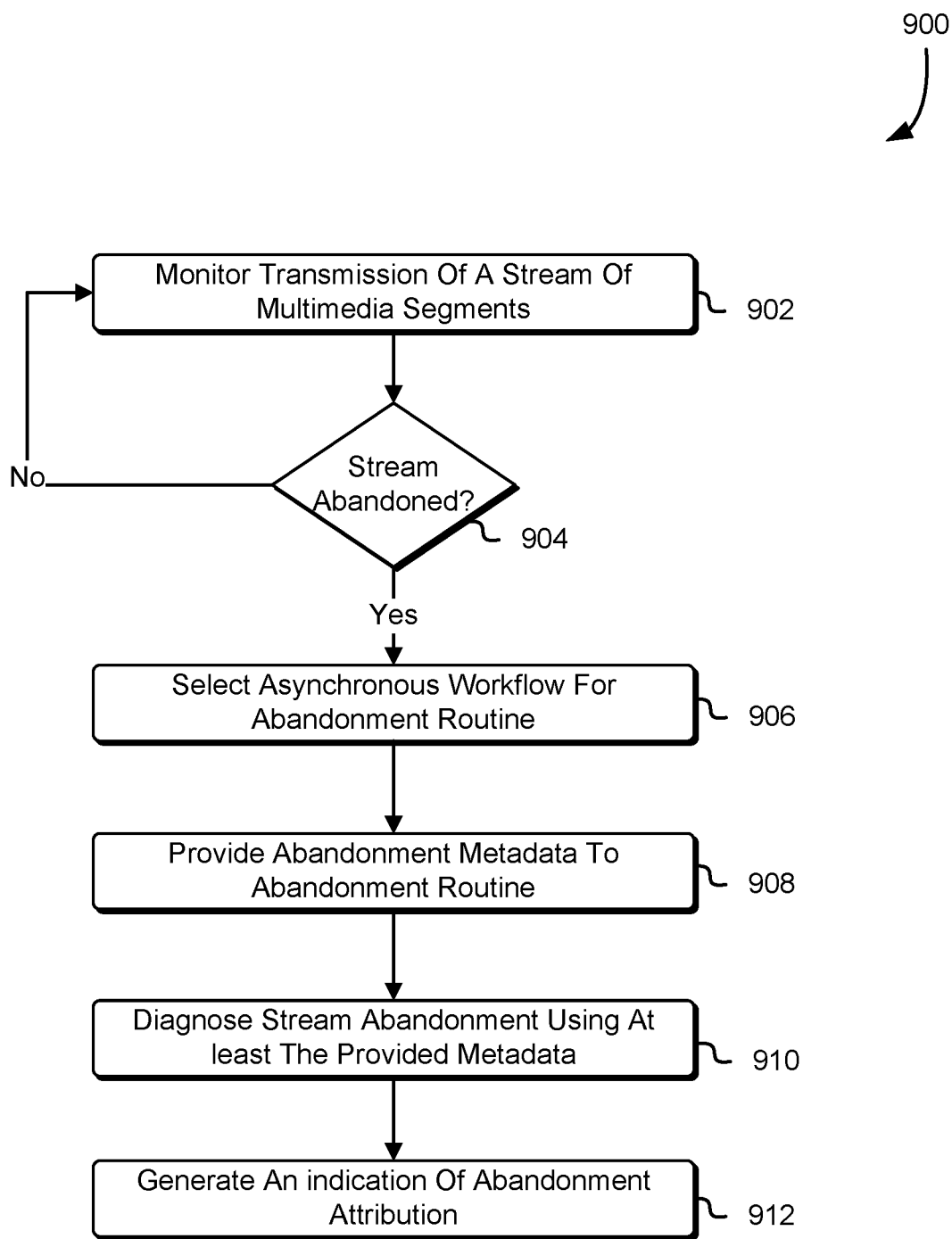
FIG. 9 illustrates a process for monitoring and diagnosing abandonment of multimedia streams.

FIG. 9 shows an illustrative example of a process 900 that may be used to perform an abandonment routine. Generally, the process 900 may be performed by any suitable system and may be performed in the context of an event-driven architecture as described above, such as in connection with FIG. 8, and utilizing techniques related to event-driven architectures described elsewhere such as in connection with FIGS. 2-4. The system performing the process 900 may use hardware, software, or a combination thereof to perform the process. In some embodiments, the process may be performed in a distributed environment such as on a virtual machine instance running on a server that is in a data center configured to fulfill requests from multiple requestors (e.g., clients of the data center or service provider).

In an embodiment, the process 900 includes monitoring 902 the transmission of a stream of multimedia segments. The multimedia stream being monitored may be a stream that includes multimedia segments that are transmitted to a requestor of the stream and will ultimately view the contents of the stream (e.g., using a multimedia playback device). In some embodiments, the transmission being monitored is bound directly for the requestor-viewer (e.g., a network address associated with the requestor is in the destination field of transmitted packets) or indirectly (e.g., the stream packets are in transmission to a downstream entity such as a content delivery network which routes the stream packets to the requestor). In some embodiments, the system may monitor the transmission of multiple multimedia streams for multiple recipients as part of a larger environment (e.g., in the context of a multimedia service provider). The system performing the process 900 may use hardware, software, or a combination thereof to perform the process. In some embodiments, the process may be performed in a distributed environment, such as on a virtual machine instance running on a server that is in a data center configured to fulfill requests from multiple requestors (e.g., clients of the data center or service provider).

The system may check 904 whether an abandonment was detected. In various embodiments, detection of the abandonment of the stream may occur in various ways. For example, in the case where a stream is terminated with an explicit transmission from the requestor (e.g., a termination request) receiving the transmission may be the detection of the condition. In other cases, a request requests segments of a stream in batches. For example, a requestor may request a batch of ten two-second segments. Near the end of the batch (e.g., roughly twenty seconds after a batch of ten two-second segments is transmitted), the requestor may request a second batch of segments. Abandonment in such a context may be detected by the system determining that a certain amount of time has elapsed—in connection with the previous example, the system may determine an abandonment of the stream if a request for the second batch is not received 18, 20, or 22 seconds after the first batch was requested or transmitted. Techniques described above in connection with FIGS. 7-8 may also be used as part of checking 904 whether a stream abandonment was detected.

If the system detects a stream abandonment, in some embodiments it selects 906 an asynchronous workflow implemented as an event-driven function using an event-driven compute service as described above in connection with FIGS. 2-8. The system may provide 908 metadata associated with the detected abandonment to an abandonment routine selected by the event-driven compute service. The metadata may include information associated with the abandonment, such as identifier information regarding one or more transmitted segments. In some embodiments, transmitted segments may be from multiple input sources (e.g., a multimedia input stream and insertion segments). A logging system such as those described in connection with FIGS. 7-8 may be used to record the metadata.

The system may further diagnose 910 the stream abandonment as part of the abandonment routine. There are many different types of errors that may be detected, such as technical errors relating to an encoding format, technical errors relating to a network condition, and attribution of abandonment. Attribution of abandonment may be made as to the content of a segment (e.g., metadata tagged in a manifest associated with a segment), to the duration of certain types of segments, or the number of occurrences of a certain type of segment. For example, abandonment may be attributed to the insertion of too many consecutive advertisements.

In some cases, the system may generate 912 an indication that includes an attribution of the abandonment. For example, the attribution of abandonment may indicate that a transcoding error is associated with one or more segments, and the indication may be provided to an upstream entity with instructions to re-transcode the affected segments. As a second example, the system may detect a technical error related to the connection of some users and run network connection diagnostics tools on those connections. As a third example, the system may use the attribution of abandonment to certain types of insertion segments to adjust the process of selecting insertion segments. For example, abandonment of a multimedia stream following an advertisement may be an indicator to a multimedia selection service to decrease or halt selection of the advertisement. In general, if notifying a system administrator, visual quality expert, developer, etc., would be helpful to mitigate the rate of abandonment, the system may broadcast a notification.

Figure 10:
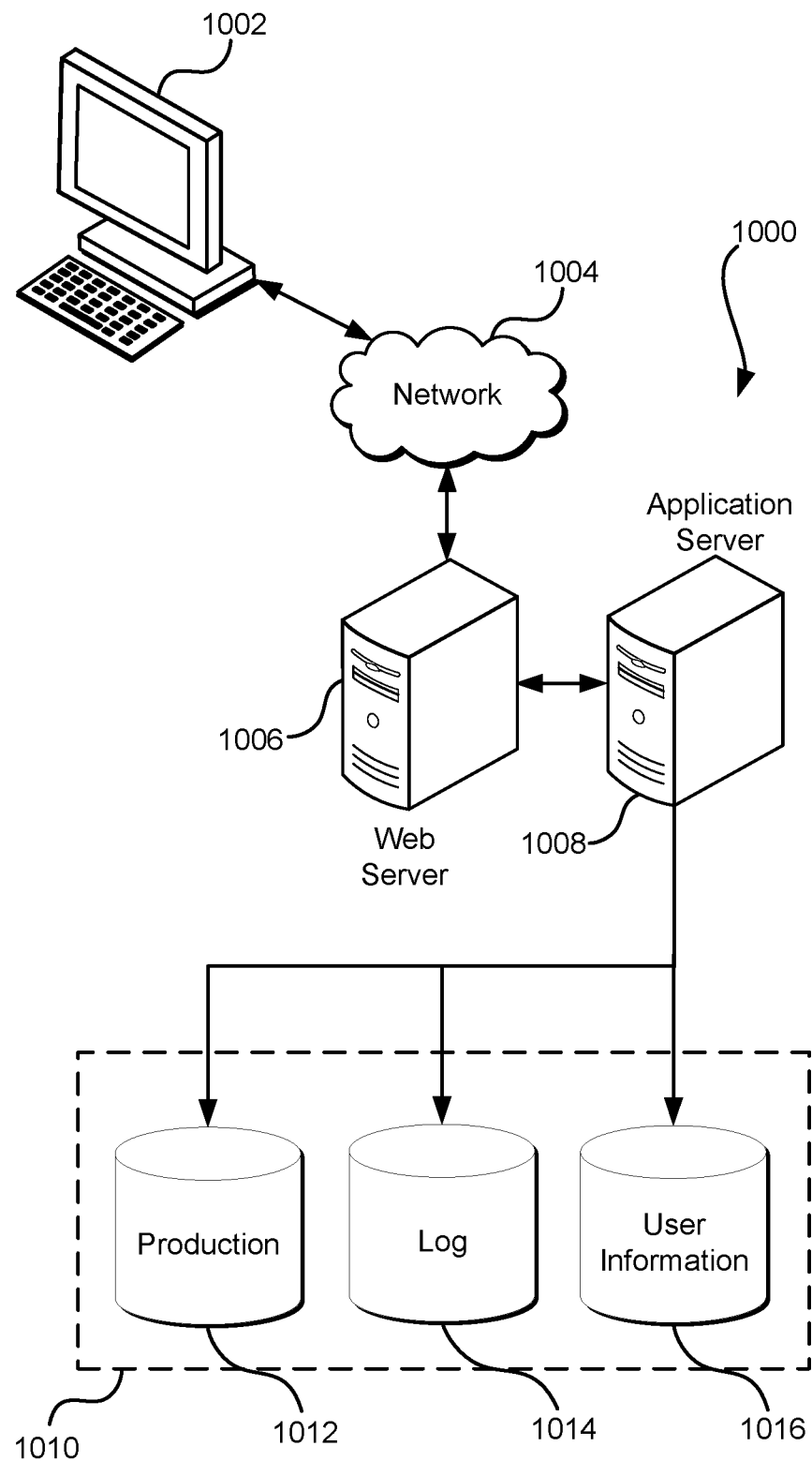
FIG. 10 illustrates an environment in which various embodiments can be implemented.

FIG. 10 illustrates aspects of an example environment 1000 for implementing aspects in accordance with various embodiments. As will be appreciated, although a web-based environment is used for purposes of explanation, different environments may be used, as appropriate, to implement various embodiments. The environment includes an electronic client device 1002, which can include any appropriate device operable to send and/or receive requests, messages, or information over an appropriate network 1004 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1002 and the application server 1008, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1010 can include several separate data tables, databases, data documents, dynamic data storage schemes and/or other data storage mechanisms and media for storing data relating to a particular aspect of the present disclosure. For example, the data store illustrated may include mechanisms for storing production data 1012 and user information 1016, which can be used to serve content for the production side. The data store also is shown to include a mechanism for storing log data 1014, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. The application server 1008 may provide static, dynamic, or a combination of static and dynamic data in response to the received instructions. Dynamic data, such as data used in web logs (blogs), shopping applications, news services, and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1002. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGP") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers, or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen, or keypad) and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). The number of items in a plurality is at least two, but can be more when so indicated either explicitly or by context.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code. Further, in some examples, the executable instructions are executed such that different instructions are executed by different processors. As an illustrative example, a non-transitory computer-readable storage medium may store instructions. A main CPU may execute some of the instructions and a graphics processor unit may execute other of the instructions. Generally, different components of a computer system may have separate processors and different processors may execute different subsets of the instructions.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A system, comprising:
a logging system that stores abandonment metadata associated with a plurality of abandoned multimedia streams, the abandonment metadata comprising an indication of one or more multimedia segments associated with abandonment of a first abandoned stream; and
an event-driven compute service that triggers an event-driven function to execute based at least in part on satisfaction of a condition associated with the abandonment metadata and that provisions a computing environment by at least initializing a virtual machine instance for executing the event-driven function in response to the satisfaction of the condition and that de-provisions the virtual machine instance as a result of completing execution of the event-driven function, the event-driven function causing the event-driven compute service to:
- obtain abandonment metadata for at least a subset of the plurality of abandoned multimedia streams, the subset including common abandonment metadata; and
- determine, based at least on the common abandonment metadata, a cause of abandonment from a plurality of causes of abandonment, wherein the cause is associated with at least part of the plurality of abandoned multimedia streams and the plurality of causes of abandonment to select the cause of abandonment from includes:
  - a transcoding error;
  - a content error;
  - a network error; and
  - an error specific to a geolocation.

2. The system of claim 1, wherein:
the first abandoned stream comprises a first multimedia segment and a second multimedia segment, wherein:
- the first multimedia segment is associated with an indication to insert multimedia content to the first abandoned stream; and
- a determination to transmit the second multimedia segment as part of the first abandoned stream is made based at least in part on the indication; and the one or more multimedia segments associated with abandonment of the first abandoned stream comprises the second multimedia segment.

3. The system of claim 2, wherein:
the abandonment metadata indicates the second multimedia segment is associated with abandonment of a second abandoned stream of the plurality of abandoned streams;
the second abandoned stream comprises the second multimedia segment;
the second multimedia segment is transmitted as part of the second abandoned stream based at least in part on a second indication to insert a multimedia segment to the second abandoned stream; and
the first abandoned stream and the second abandoned stream include different multimedia content.

4. The system of claim 1, wherein:
the common abandonment metadata comprises:
- a common location of a plurality of recipients; and
- abandonment times by the plurality of recipients; and the event-driven function further causes the event-driven compute service to perform a network connectivity test to recipients from the common location.

5. A computer-implemented method, comprising:
detecting satisfaction of a condition based at least in part on abandonment metadata associated with a first abandoned stream, the abandonment metadata indicating one or more multimedia segments associated with abandonment of the first abandoned stream;
selecting an event-driven function from a plurality of event-driven functions based at least in part on the abandonment metadata associated with the first abandoned stream, wherein an event-driven compute service is configured to provision a computing environment to execute the selected event-driven function and invoke the event-driven function on detecting satisfaction of the condition;
obtaining a set of abandonment metadata associated with a plurality of abandoned multimedia streams, the set including abandonment metadata in common; and
determining, based at least in part on the set of abandonment metadata, a cause of abandonment from a plurality of causes of abandonment is associated with at least part of the plurality of multimedia streams, wherein the cause of abandonment is selected from the plurality of causes of abandonment, further wherein the plurality of causes of abandonment includes:
- a particular encoding format common to the at least part of the plurality of multimedia streams;
- a particular multimedia content common to the at least part of the plurality of multimedia streams;
- a particular network condition common to requestors of the at least part of the plurality of multimedia streams; and
- a particular geolocation common to the requestors of the at least part of the plurality of multimedia streams.

6. The computer-implemented method of claim 5, wherein:
the first abandoned stream comprises a first multimedia segment and a second multimedia segment, wherein:
- the first multimedia segment is associated with an indication to insert multimedia content to the first abandoned stream; and
- a determination to transmit the second multimedia segment as part of the first abandoned stream is made based at least in part on the indication; and the one or more multimedia segments associated with abandonment of the first abandoned stream comprises the second multimedia segment.

7. The computer-implemented method of claim 6, wherein:
the set of abandonment metadata comprises a second abandonment metadata, wherein the second abandonment metadata indicates the second multimedia segment is associated with abandonment of a second abandoned stream;
the second abandoned stream comprises the second multimedia segment;
the second multimedia segment is transmitted as part of the second abandoned stream based at least in part on a second indication to insert a multimedia segment to the second abandoned stream; and
the first abandoned stream and the second abandoned stream include different multimedia content.

8. The computer-implemented method of claim 6, further comprising:
- receiving a second indication to insert multimedia content to a multimedia stream including multimedia content in common with the first abandoned stream;
- obtaining a third multimedia segment based at least in part on the second indication and the determination of the cause, wherein the third multimedia segment is different from the second multimedia segment; and
- making the third multimedia segment available as part of the multimedia stream.

9. The computer-implemented method of claim 5, further comprising:

detecting one or more stream abandonments; and storing, in a persistent storage medium, abandonment metadata associated with the one or more stream abandonments as part of the set of abandonment metadata.

10. The computer-implemented method of claim 5, wherein detecting satisfaction of the condition comprises determining a difference between a first rate of abandonment of the plurality of multimedia streams and a second rate of abandonment of a control group of multimedia streams is statistically significant according to one or more analysis of variance (ANOVA) techniques.

11. The computer-implemented method of claim 5, wherein:

the first abandoned stream is associated with a first requestor; and a second abandoned stream of the set is associated with a second requestor, wherein the first requestor and the second requestor are different requestors.

12. The computer-implemented method of claim 5, wherein the common abandonment metadata comprises locations of requestors indicated in the set of abandonment metadata.

13. A non-transitory computer-readable storage medium storing executable instructions that, as a result of being executed by one or more processors of a computer system, cause the computer system to at least:

detect satisfaction of a condition based at least in part on abandonment metadata associated with a first abandoned stream, the abandonment metadata indicating one or more multimedia segments associated with abandonment of the first abandoned stream;

select an event-driven function from a plurality of event-driven functions based at least in part on the abandonment metadata;

as a result of detecting satisfaction of the condition, provision a computing environment to execute the event-driven function;

obtain a set of abandonment metadata associated with a plurality of abandoned multimedia streams, the set including abandonment metadata; and determine, based at least in part on the set of abandonment metadata, a cause of abandonment from a plurality of causes of abandonment is associated with at least part of the plurality of multimedia streams, wherein the cause of abandonment is selected from the plurality of causes of abandonment, further wherein the plurality of causes of abandonment includes both technical errors and content errors.

14. The non-transitory computer-readable storage medium of claim 13, wherein:

the first abandoned stream comprises a first multimedia segment and a second multimedia segment, wherein:

the first multimedia segment is associated with an indication to insert multimedia content to the first abandoned stream; and a determination to transmit the second multimedia segment as part of the first abandoned stream is made based at least in part on the indication; and the one or more multimedia segments associated with abandonment of the first abandoned stream comprises the second multimedia segment.

15. The non-transitory computer-readable storage medium of claim 14, wherein:

the set of abandonment metadata comprises a second abandonment metadata, wherein the second abandonment metadata indicates the second multimedia segment is associated with abandonment of a second abandoned stream;

the second abandoned stream comprises the second multimedia segment;

the second multimedia segment is transmitted as part of the second abandoned stream based at least in part on a second indication to insert a multimedia segment to the second abandoned stream; and the first abandoned stream and the second abandoned stream include different multimedia content.

16. The non-transitory computer-readable storage medium of claim 14, wherein the instructions that cause the computer system to:

obtain a second indication to insert multimedia content to a multimedia stream including multimedia content in common with the first abandoned stream;

obtain a third multimedia segment based at least in part on the second and the determination of the cause, wherein the third multimedia segment is different from the second multimedia segment; and make the third multimedia segment available as part of the multimedia stream.

17. The non-transitory computer-readable storage medium of claim 13, wherein the common abandonment metadata comprises a content type indicated in the set and the abandonment metadata.

18. The non-transitory computer-readable storage medium of claim 17, wherein:

a first multimedia segment associated with a first abandonment metadata of the set indicates the content type;

a second multimedia segment associated with a second abandonment metadata of the set indicates the content type; and the first multimedia segment and the second multimedia segment include different multimedia content.

19. The non-transitory computer-readable storage medium of claim 13, wherein the common abandonment metadata comprises abandonment metadata associated with two or more abandoned streams including an identifier associated with a second multimedia segment.

20. The non-transitory computer-readable storage medium of claim 13, wherein the common abandonment metadata comprises an encoding format of multimedia segments associated with the set.

* * * * *